(12) United States Patent
Gysling et al.

(10) Patent No.: US 7,672,794 B2
(45) Date of Patent: Mar. 2, 2010

(54) SYSTEM AND METHOD FOR OPERATING A FLOW PROCESS

(75) Inventors: Daniel L. Gysling, Glastonbury, CT (US); Alan D. Kersey, South Glastonbury, CT (US); Patrick Curry, Glastonbury, CT (US)

(73) Assignee: Expro Meters, Inc., Wallingford, CT (US)

( * ) Notice: Subject to any disclaimer, the term of this patent is extended or adjusted under 35 U.S.C. 154(b) by 794 days.

(21) Appl. No.: 10/875,859

(22) Filed: Jun. 24, 2004

(65) Prior Publication Data

US 2005/0005711 A1    Jan. 13, 2005

Related U.S. Application Data

(60) Provisional application No. 60/482,264, filed on Jun. 24, 2003, provisional application No. 60/487,765, filed on Jul. 15, 2003, provisional application No. 60/487,678, filed on Jul. 15, 2003.

(51) Int. Cl.
    *G01F 1/00* (2006.01)
(52) U.S. Cl. .......................... 702/45; 702/48; 702/100; 73/861.23; 73/861.26; 73/861.25; 73/861.42
(58) Field of Classification Search .................. 702/45, 702/48, 100; 73/861.23–861.26, 861.42, 73/861.08, 861.44, 49.5, 53.01, 61.79, 61.47, 73/61.49, 579, 643, 653, 656, 657
See application file for complete search history.

(56) References Cited

U.S. PATENT DOCUMENTS

| | | | |
|---|---|---|---|
| 5,741,980 A | 4/1998 | Hill et al. .................. | 73/861.04 |
| 6,354,147 B1 * | 3/2002 | Gysling et al. ............. | 73/61.79 |
| 6,435,030 B1 | 8/2002 | Gysling et al. | |
| 6,450,037 B1 | 9/2002 | Davis et al. | |
| 6,463,813 B1 | 10/2002 | Gysling et al. | |
| 6,536,291 B1 | 3/2003 | Gysling et al. | |
| 6,587,798 B2 | 7/2003 | Gysling et al. | |

(Continued)

FOREIGN PATENT DOCUMENTS

WO    WO990619    1/1999

(Continued)

OTHER PUBLICATIONS

"Noise and Vibration Control Engineering Principles and Applications", Leo L. Beranek and Istvan L. Ver, A. Wiley Interscience Publication, pp. 537-541, Aug. 1992.

(Continued)

*Primary Examiner*—Drew A Dunn
*Assistant Examiner*—Hien X Vo

(57) ABSTRACT

A system for monitoring, diagnosing, and/or controlling a flow process uses one or more flow meters based on an array of pressure sensors. A signal processor outputs at least one of a flow signal, a diagnostic signal, and a control signal in response to the pressure signals from the pressure sensors. The flow signal indicates the at least one parameter of the fluid, the diagnostic signal indicates a diagnostic condition of a device in the flow process, and the control signal is effective in adjusting an operating parameter of at least one device in the flow process. The system may be arranged as a distributed control system (DCS) architecture for monitoring a plurality of flow meters based on array-processing installed at various locations throughout a flow process.

35 Claims, 14 Drawing Sheets

U.S. PATENT DOCUMENTS

| | | | |
|---|---|---|---|
| 6,601,458 B1 | 8/2003 | Gysling et al. | |
| 6,609,069 B2 | 8/2003 | Gysling et al. | |
| 6,691,584 B2 * | 2/2004 | Gysling et al. | 73/861.42 |
| 6,698,297 B2 | 3/2004 | Gysling | |
| 6,732,575 B2 | 5/2004 | Gysling et al. | |
| 6,782,150 B2 | 8/2004 | Davis et al. | |
| 6,813,962 B2 | 11/2004 | Gysling et al. | |
| 6,837,098 B2 | 1/2005 | Gysling et al. | |
| 6,862,920 B2 | 3/2005 | Gysling et al. | |
| 6,889,562 B2 | 5/2005 | Gysling et al. | |
| 6,898,541 B2 | 5/2005 | Gysling et al. | |
| 6,959,604 B2 | 11/2005 | Davis et al. | |
| 6,971,259 B2 | 12/2005 | Gysling | |
| 7,032,432 B2 | 4/2006 | Gysling et al. | |
| 7,121,152 B2 * | 10/2006 | Winston et al. | 73/861.42 |
| 7,245,385 B2 * | 7/2007 | Kersey | 356/519 |
| 2002/0095263 A1 | 7/2002 | Gysling et al. | |
| 2002/0129662 A1 | 9/2002 | Gysling et al. | |
| 2003/0089161 A1 | 5/2003 | Gysling | |
| 2003/0136186 A1 | 7/2003 | Gysling | |
| 2003/0154036 A1 | 8/2003 | Gysling et al. | |
| 2004/0069069 A1 | 4/2004 | Croteau | |
| 2004/0074312 A1 | 4/2004 | Gysling | |
| 2004/0168522 A1 | 9/2004 | Bailey et al. | |
| 2004/0168523 A1 | 9/2004 | Bailey et al. | |
| 2004/0194539 A1 | 10/2004 | Gysling | |
| 2004/0199340 A1 | 10/2004 | Gysling et al. | |
| 2004/0199341 A1 | 10/2004 | Gysling et al. | |
| 2004/0210404 A1 | 10/2004 | Gysling et al. | |
| 2004/0231431 A1 | 11/2004 | Bailey et al. | |
| 2004/0255695 A1 | 12/2004 | Gysling et al. | |
| 2005/0005711 A1 | 1/2005 | Curry et al. | |
| 2005/0005712 A1 | 1/2005 | Gysling et al. | |
| 2005/0005713 A1 | 1/2005 | Curry et al. | |
| 2005/0011258 A1 | 1/2005 | Didden et al. | |
| 2005/0011278 A1 | 1/2005 | Brown et al. | |
| 2005/0011283 A1 | 1/2005 | Gysling et al. | |
| 2005/0011284 A1 | 1/2005 | Davis et al. | |
| 2005/0012935 A1 * | 1/2005 | Kersey | 356/519 |
| 2005/0039520 A1 | 2/2005 | Bailey et al. | |
| 2005/0044966 A1 | 3/2005 | Croteau et al. | |
| 2005/0072216 A1 | 4/2005 | Engel | |
| 2005/0125166 A1 | 6/2005 | Davis et al. | |
| 2005/0125169 A1 * | 6/2005 | Loose | 702/45 |
| 2005/0125170 A1 | 6/2005 | Gysling | |
| 2005/0159904 A1 * | 7/2005 | Loose et al. | 702/45 |
| 2006/0037385 A1 | 2/2006 | Gysling | |
| 2006/0037399 A1 | 2/2006 | Brown | |
| 2007/0034017 A1 * | 2/2007 | Winston et al. | 73/861.42 |

FOREIGN PATENT DOCUMENTS

| | | |
|---|---|---|
| WO | WO020894 | 11/2002 |

OTHER PUBLICATIONS

"Two Decades of Array Signal Processing Research", The Parametric Approach, H. Krim and M. Viberg, IEEE Signal Processing Magazine, Jul. 1996, pp. 67-94.

"Development of an array of pressure sensors with PVDF film, Experiments in Fluids 26,", Jan. 8, 1999, Springer-Verlag.

"Viscous Attentuation of Acoustic Waves in Suspensions" by R.L. Gibson, Jr. and M.N. Toksoz, May 1989.

"Piezoelectric Polymers" J.S. Harrison—NASA Langley Research Center and Z. Ounaies ICASE, Dec. 2001.

Piezo Film Sensors Technical Manual—Measurement Specialties, Inc. Apr. 2, 1999.

Mass Fraction Measurements in Multiphase Flows using a Clamp-on PVDF Array—Johan Carlson, 2000IEEE.

* cited by examiner

SYSTEM AND METHOD FOR OPERATING A FLOW PROCESS

CROSS-REFERENCE TO RELATED APPLICATIONS

This application claims the benefit of U.S. Provisional Patent Application No. 60/482,264 filed Jun. 24, 2003, U.S. Provisional Patent Application No. 60/487,765 filed Jul. 15, 2003, and U.S. Provisional Patent Application No. 60/487,678 filed Jul. 15, 2003, all of which are incorporated by reference herein in their entirety.

FIELD OF THE INVENTION

This invention relates to a system for operating a flow process, and more particularly, to a system for monitoring, diagnosing, and/or controlling a flow process using one or more flow meters based on array-processing.

BACKGROUND OF THE INVENTION

A fluid flow process (flow process) includes any process that involves the flow of fluid through pipes, ducts, or other conduits, as well as through fluid control devices such as pumps, valves, orifices, heat exchangers, and the like. Flow processes are found in many different industries such as the oil and gas industry, refining, food and beverage industry, chemical and petrochemical industry, pulp and paper industry, power generation, pharmaceutical industry, and water and wastewater treatment industry. The fluid within the flow process may be a single phase fluid (e.g., gas, liquid or liquid/liquid mixture) and/or a multi-phase mixture (e.g. paper and pulp slurries or other solid/liquid mixtures). The multi-phase mixture may be a two-phase liquid/gas mixture, a solid/gas mixture or a solid/liquid mixture, gas entrained liquid or a three-phase mixture.

Operation of a flow process often requires that various aspects of the process be monitored, controlled, and/or diagnosed. For example, monitoring tasks may include observing and/or recording various parameters of the process. These parameters may include consistency of the fluid, composition of the fluid, mass flow rate of the fluid, volumetric flow rate of the fluid, among others. Control tasks may include adjusting operating parameters of various devices in the flow process based on the monitored parameters. For example, pump speed or valve position may be adjusted based on flow rate, composition of the fluid, and the like.

Many industrial plants and processes also have a need to monitor various machinery for failures, malfunction and/or maintenance problems. In particular, it is desirable to predict when various components, devices or equipment (e.g., motors, fans, pumps, generators, engines, gears, belts, drives, pulleys, hangers, clamps, actuators, valves, meters, etc.) within a plant or process are in need of maintenance, repair or replacement. Such diagnostic monitoring and prediction for industrial machinery can reduce or eliminate flow process shutdown time and thereby reduce operating expenses.

Typically, the monitoring, control, and/or diagnosis of a flow process is performed using numerous meters, each performing a single function. For example, flow meters are used to monitor fluid flow, temperature gages are used to monitor fluid temperature, and pressure sensors are used to measure fluid temperature. Because each meter performs a single function, monitoring, control, and/or diagnosis of the flow process requires the use of many different meters.

Modern flow processes may implement a Distributed Control System (DCS) architecture, in which signals indicative of the parameter sensed by each meter are provided to a central processor, which may record and display the parameters. The DCS architecture may further be arranged to provide control signals to various devices in the flow process in response to the signals from the meters. One commercially available DCS architecture is manufactured by Emerson Corporation under the trade name of Plant Web® (www.plantweb.com). While such DCS architectures are effective in monitoring and controlling flow processes, a large number of meters in the flow process can burden the central processor. Therefore, it is desirable to decrease the number of meters in the flow process.

In addition, typical meters are invasive. That is, they are installed such that they extend through piping into contact with the fluid in the flow process. As a result, installation or maintenance of the meter often requires at least a portion of the flow process to be isolated. Therefore, it is desirable to have a meter that is easily installed.

BRIEF SUMMARY OF THE INVENTION

The above-described and other drawbacks and deficiencies of the prior art are overcome or alleviated by a system for operating a flow process. The system comprises a meter for measuring at least one parameter of a fluid in the flow process and a signal processor. The meter includes a spatial array of at least two pressure sensors disposed at different axial locations along an pipe in the flow process, with each of the at least two pressure sensors providing a pressure signal indicative of unsteady pressure within the pipe at a corresponding axial location of the pipe. The signal processor outputs at least one of a flow signal, a diagnostic signal, and a control signal in response to the pressure signals. The flow signal indicates the at least one parameter of the fluid, the diagnostic signal indicates a diagnostic condition of a device in the flow process, and the control signal is effective in adjusting an operating parameter of at least one device in the flow process. The signal processor may provide the control signal in response to the parameter of the fluid. Preferably, the at least two pressure sensors are wrapped around at least a portion of the pipe and do not contact the fluid.

In embodiments where the signal processor is configured to output the flow signal, the system may further include a second signal processor configured to output at least one of the control signal and the diagnostic signal in response to the flow signal.

In various embodiments, the parameter of the fluid includes at least one of: speed of sound in the fluid, gas volume fraction of the fluid, volumetric flow rate, size of particles suspended in the fluid, mass flow rate of the fluid, enthalpy of the fluid, and velocity of the fluid. In embodiments where the parameter of the fluid is the gas volume fraction of the fluid, the signal processor may include flow logic configured to: determine a slope of an acoustic ridge in a k-ω plane to determine the speed of sound propagating through the fluid; and determine the gas volume fraction of the flow in response to the measured speed of sound. In such embodiments, the flow logic may further be configured to: determine the volumetric flow rate through the pipe using a cross-sectional area of the pipe and the velocity of the fluid, and correct the volumetric flow rate of the fluid using the gas volume fraction of the fluid.

In embodiments where the signal processor is configured to output the diagnostic signal, the signal processor may compare an input evaluation signal based on the pressure signals against a diagnostic evaluation criteria to determine the diagnostic condition of the device. In such embodiments, the evaluation criteria may be based on a signature in at least one of the frequency domain, time domain, spatial domain, wave-number, and k-w domain.

In various embodiments, the system may further comprise a plurality of meters, with the signal processor being further configured to output the control signal in response to signals from the plurality of meters.

In another aspect of the invention, a method of operating a flow process comprises: receiving pressure signals from a meter comprising a spatial array of at least two pressure sensors disposed at different axial locations along a pipe in the flow process, each of the at least two pressure sensors providing a pressure signal indicative of unsteady pressure within the pipe at a corresponding axial location; and providing at least one of a diagnostic signal and a control signal in response to the pressure signals, the diagnostic signal indicating a diagnostic condition of a device of the flow process, and the control signal being effective in adjusting an operating parameter of at least one device of the flow process. Preferably, the at least two pressure sensors are wrapped around at least a portion of the pipe and do not contact fluid in the flow process. The method may further include adjusting the control signal in response to signals from a plurality of meters.

In various embodiments, the method may further comprise: processing the pressure signals to provide a flow signal indicative of a parameter of a fluid flowing within the flow process. Providing the control signal in response to the pressure signals may include adjusting the control signal in response to the flow signal. The parameter of the fluid may include at least one of: speed of sound in the fluid, gas volume fraction of the fluid, volumetric flow rate, size of particles suspended in the fluid, mass flow rate of the fluid, enthalpy of the fluid, and velocity of the fluid.

In embodiments where the parameter of the fluid is the gas volume fraction of the fluid, processing the pressure signals to provide the flow signal may include: determining a slope of an acoustic ridge in a k-ω plane to determine the speed of sound propagating through the fluid; and determining the gas volume fraction of the flow in response to the measured speed of sound. In such embodiments, processing the pressure signals to provide the flow signal may further include: determining the volumetric flow rate of the pipe using a cross-sectional area of the pipe and the velocity of the fluid, and correcting the volumetric flow rate of the fluid using the gas volume fraction of the fluid.

In embodiments wherein the diagnostic signal is provided, the method may include comparing an input evaluation signal based on the pressure signals against a diagnostic evaluation criteria to determine the diagnostic condition of the device. In such embodiments, the evaluation criteria may be based on a signature in at least one of the frequency domain, time domain, spatial domain, wave-number, and k-w domain.

In another aspect of the invention, a diagnostic monitoring system for monitoring a diagnostic condition of a device that is coupled to a pipe comprises: at least one sensor disposed so as to measure unsteady pressures within or strain fields on the pipe, each sensor providing a sensor input signal; and diagnostic processing logic, responsive to said sensor input signals, which provides a diagnostic output signal indicative of a diagnostic condition of the device.

BRIEF DESCRIPTION OF THE DRAWINGS

The above-described and other features and advantages of the invention will become apparent from a consideration of the subsequent detailed description presented in connection with accompanying drawings, in which.

DETAILED DESCRIPTION

The present invention provides a distributed control system (DCS) architecture for monitoring a plurality of flow meters based on array-processing installed at various locations throughout a flow process, which is similar to that described in U.S. Provisional Patent Application 60/474,098 filed May 28, 2003, which is incorporated herein by reference. The present invention further contemplates providing means to control the flow process and/or diagnose problems or anticipated problems with the flow process. The present invention is not limited to any particular industrial flow process. For example, the system embodying the present invention is applicable for the oil and gas industry, refining, food and beverage industry, chemical and petrochemical industry, pulp and paper industry, power generation, pharmaceutical industry, and water and wastewater treatment.

Figure 1:
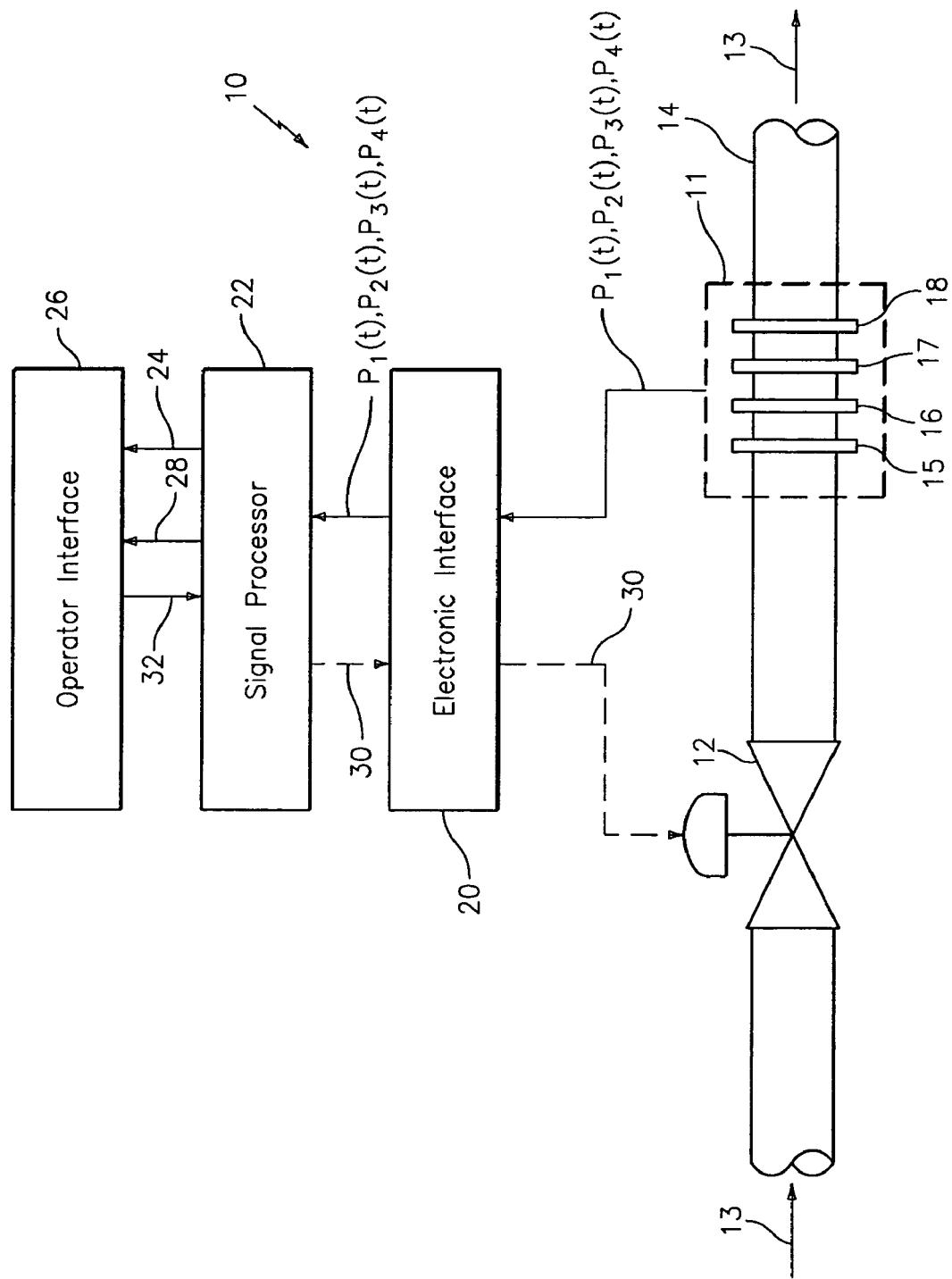
FIG. 1 is a schematic block diagram of a system for operating a process flow using a meter based on array processing, in accordance with various embodiments of the present invention.

FIG. 1 illustrates a system 10 for operating a flow process. The term "operate" is considered to include the monitoring, diagnosing, and/or controlling of at least a portion of the flow process. In FIG. 1, system 10 is a simplified DCS architecture monitoring a portion of an industrial flow process including a single flow meter 11 and a single flow control device 12. As shown, the portion of the flow process includes a single phase or multiphase fluid 13 flowing through a pipe, duct or other form of conduit (hereinafter "pipe") 14. The flow control device 12 is shown as a valve, but may include any other device such as a pump, throttle, vane, heat exchanger, and the like, which directs the fluid 13 and/or changes a parameter (e.g., direction, pressure, temperature, consistency, density, entrained air, mass flow, volumetric flow, composition, etc.) of the fluid 13. As will be described in greater detail hereinafter, the flow meter 11 includes an array of pressure sensors 15, 16, 17, and 18 spaced axially along the pipe 14 to measure unsteady pressures created by sound propagating through the fluid 13 and/or unsteady pressures created by vortical disturbances propagating within the fluid 13. The measurement of the unsteady pressures is then processed to determine a parameter of the fluid 13. While the flow meter 11 is shown as including four pressure sensors, it is contemplated that the flow meter 11 may include an array of two or more pressure sensors, each providing a pressure signal P(t) indicative of unsteady pressure within the pipe 14 at a corresponding axial location of the pipe 14.

Figure 2:
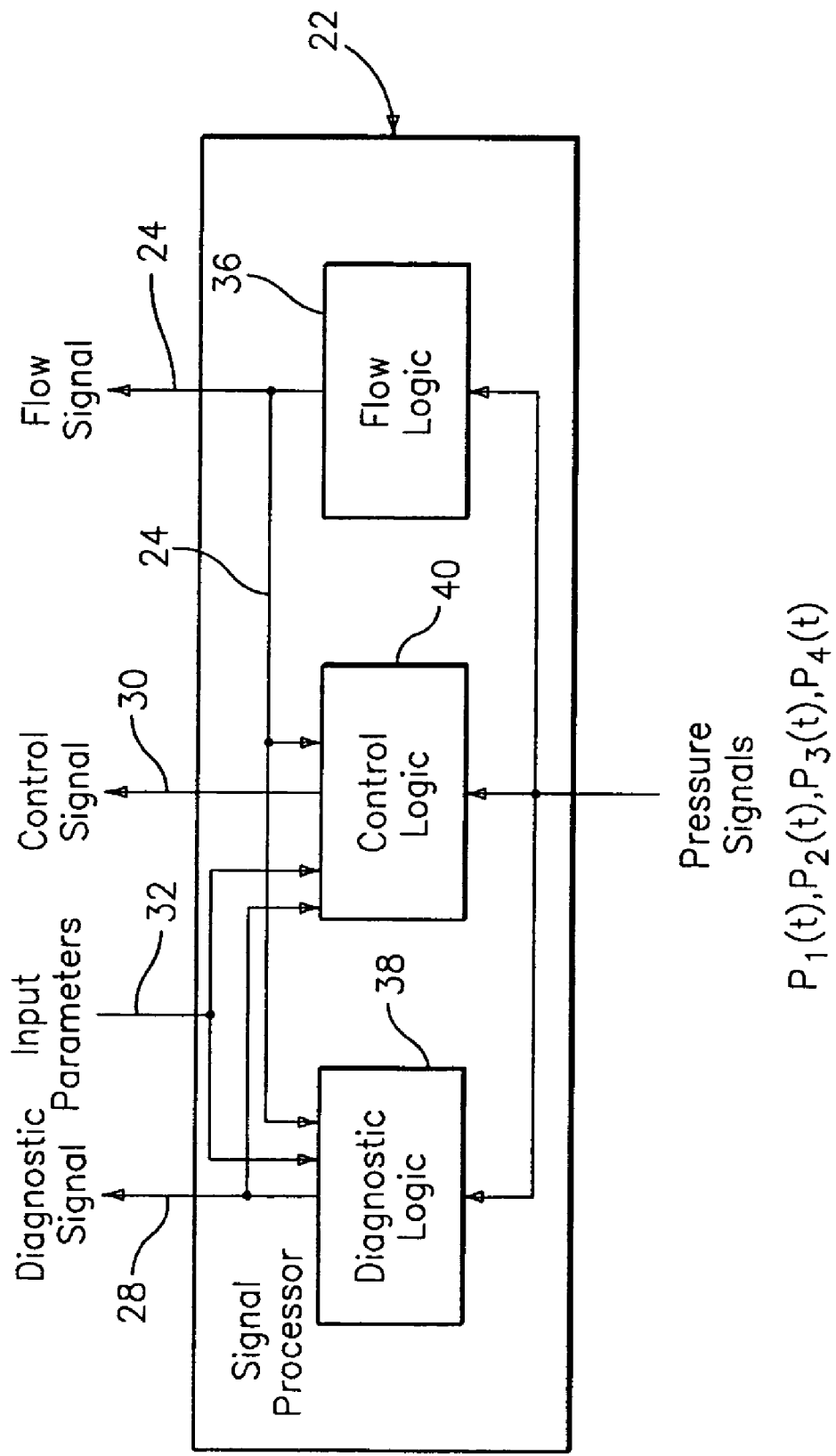
FIG. 2 is a schematic block diagram of a signal processor for the system, in accordance with various embodiments of the present invention.

Referring to FIGS. 1 and 2, the system 10 includes an electronic interface 20 for receiving the pressure signals $P_1(t)$, $P_2(t)$, $P_3(t)$, $P_4(t)$ provided by the pressure sensors 15-18 and providing the pressure signals to a controller or processor (hereinafter "signal processor") 22. The electronic interface 20 may include any device that translates or arranges data in one protocol, sequence, medium and/or transmission mode to another protocol, sequence, medium and/or transmission mode. For example, electronic interface 20 may include one or more of a multiplexer/demultiplexer, a router, a bridge, a switch, a translator, a modulator/demodulator, a fiber optic media or mode converter, and the like.

The signal processor 22 may be any one or more devices for executing programmed instructions, such as one or more microprocessors or application specific integrated circuits (ASICs), and may include memory for storing programmed instructions, set points, parameters, and for buffering or otherwise storing data. For example, the signal processor 22 may be a general-purpose computer.

The signal processor 22 receives the pressure signals $P_1(t)$, $P_2(t)$, $P_3(t)$, $P_4(t)$ and applies this data to flow logic 36 executed by the signal processor 22. Using this data, the flow logic 36 determines a parameter of the fluid 13, such as sound speed, mach number, consistency, composition, entrained air, density, mass flow rate, volumetric flow rate and others, in accordance with an algorithm. The signal processor 22 may then provide the determined flow parameter as a flow signal 24 to an operator interface 26 which enables operating personnel to monitor the flow process. The flow logic 36 is described in further detail hereinafter.

The operator interface 26 may include an output device, such as a printer or monitor, and an input device, such as a keyboard. The operator interface 26 may also include one or more computers in a network of computers.

The signal processor 22 may apply one or more of the pressure signals $P_1(t)$, $P_2(t)$, $P_3(t)$, $P_4(t)$ and/or the flow signal 24 to diagnose the health of any device that causes unsteady pressures to be generated in the section of the pipe 14 where flow meter 11 is disposed. The diagnosed device may be any machinery, component, or equipment, e.g., motor, fan, pump, generator, engine, gearbox, belt, drive, pulley, hanger, clamp, actuator, valve, meter, or the like. In the embodiment shown, for example, diagnostic logic 38 executed by the signal processor 22 may process the pressure signals $P_1(t)$, $P_2(t)$, $P_3(t)$, $P_4(t)$ and/or the flow signal 24 to diagnose the health of the device 12. The diagnostic logic 38 may compare the measured data to previously stored data or to parameters 32 input by operating personnel via the operator interface 26 to diagnose or evaluate the changes between the measured and stored or input data. The diagnostic logic 38 provides an output signal indicative of the health of the device, as is described in further detail hereinafter. The signal processor 22 may output the diagnostic signal 128 to the operator interface 26.

The signal processor 22 may also apply the pressure signals $P_1(t)$, $P_2(t)$, $P_3(t)$, $P_4(t)$, the flow signal 24, and/or the diagnostic signal 28 to control one or more devices 12 in the flow process. As shown in FIG. 2, the signal processor 22 may include control logic 40 which, in response to this data, causes a control signal 30 to be output from the signal processor 22 to the electronic interface 20. The electronic interface 20, in turn, provides the control signal 30 to one or more devices 12 to change an operating parameter of one or more devices 12 in the flow process. The control logic 40 may, for example, compare the measured pressure signals $P_1(t)$, $P_2(t)$, $P_3(t)$, $P_4(t)$, or the flow signal 124 to stored parameters, set points, or input parameters 32 to determine an appropriate control signal 30 for causing the appropriate operating condition of the one or more operating devices 12. For example, if fluid 13 flow is determined to be below a stored threshold value, control logic 40 may provide control signals 30 to valves and/or pumps in the flow process. In another example, if the diagnostic signal 28 indicates that a device is malfunctioning, then the control logic 40 may provide a control signal 30 effective to stop operation of the device.

In the mode of operation where control logic 40 provides control signals 30 to one or more devices 12, the system 10 is operating in a "closed loop" mode. Alternatively, the system 10 may simply function as a monitoring and/or diagnostic system (without control logic 40), and thus function in an "open loop" mode.

Figure 3:
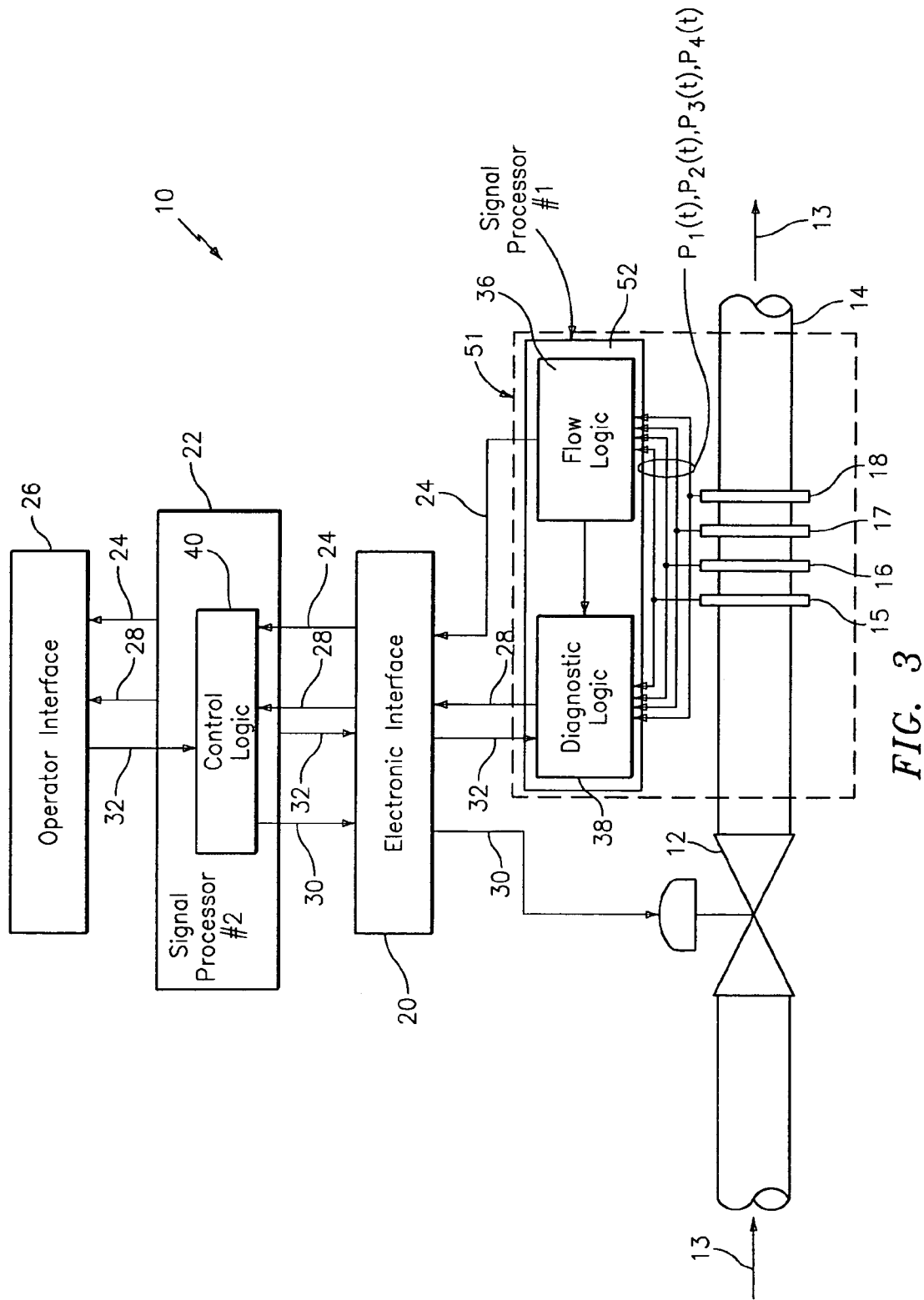
FIG. 3 is a schematic block diagram of the system for operating a process flow using an alternative flow meter in accordance with various embodiments of the present invention.

Referring to FIG. 3, system 10 is shown including an alternative flow meter 51, which includes a signal processor 52 configured to execute the flow logic 36 and diagnostic logic 38. Signal processor 51 receives the pressure signals $P_1(t)$, $P_2(t)$, $P_3(t)$, $P_4(t)$ and applies this data to the flow logic 36 executed by the signal processor 52. Using this data, the flow logic 36 determines a parameter of the process flow, such as sound speed, mach number, consistency, composition, entrained air, density, mass flow rate, volumetric flow rate and others, in accordance with an algorithm. The signal processor 52 may then provide the determined flow parameter as a flow signal 24 to the signal processor 22, via electronic interface 20.

The signal processor 52 may also apply one or more of the pressure signals $P_1(t)$, $P_2(t)$, $P_3(t)$, $P_4(t)$ and/or the flow signal 24 to diagnose the health of any device that causes unsteady pressures to be generated in the section of the pipe 14 where flow meter 51 is disposed. As previously described, the diagnosed device may be any machinery, component, or equipment, e.g., motor, fan, pump, generator, engine, gearbox, belt, drive, pulley, hanger, clamp, actuator, valve, meter, or the like.

In the flow meter 51, the diagnostic logic 38 executed by the signal processor 52 may process one or more of the pressure signals $P_1(t)$, $P_2(t)$, $P_3(t)$, $P_4(t)$ and/or the flow signal 24 to diagnose the health of the device 12. The diagnostic logic 38 may compare the measured data to previously stored data or to input parameters 32, which is provided to the signal processor 52, via the operator interface 26, the signal processor 22, and the electronic interface 20, to diagnose or evaluate the changes between the measured and stored/input data. The signal processor 52 may output a diagnostic signal 28 indicative of the health of the diagnosed device to the signal processor 22 via electronic interface 20.

It is contemplated that, where the signal processor 52 uses less than all of the pressure signals $P_1(t)$, $P_2(t)$, $P_3(t)$, $P_4(t)$ to diagnose the health of a device, the signal processor 52 need not receive input from each pressure sensor 15-28. Indeed, it is contemplated that a single pressure sensor may be used to perform diagnostic monitoring, provided the sensor response bandwidth is sufficient to provide a pressure signal sufficient to compare and evaluate against the diagnostic evaluation criteria.

In the embodiment of FIG. 3, the diagnostic signal 28 and the flow signal 24 are output in parallel to the electronic interface 20. Alternatively, it is contemplated that these signals may be output in series (e.g., by multiplexing) along a common transmission path (e.g., wire). Also, it is contemplated that the signal processor 52 may include selection logic that determines whether the diagnostic signal 28 or the flow signal 24 is to be output from the signal processor 52. The selection logic may be responsive to a selection signal provided as part of the input parameters 32.

In an open loop mode, the diagnostic signal 28 and the flow signal 24 may be output from the signal processor 22 to the operator interface 26 for monitoring by operating personnel. In a closed loop mode, the signal processor 22 may apply the flow signal 24, and/or the diagnostic signal 28 to the control logic 40. As previously described, the signal processor 22 provides the control signal 30 from the control logic 40 to at least one device 12 via the electronic interface 20 to change an operating parameter of at the least one device 12. The control logic 40 may, for example, compare the flow signal 24 to stored parameters, set points, or input parameters 32 to determine an appropriate control signal 30 for causing the appropriate operating condition of the one or more operating devices 12. For example, if fluid 13 flow is determined to be below a stored threshold value, control logic 40 may provide control signals 30 to valves and/or pumps in the flow process. In another example, if the diagnostic signal 28 indicates that a device is malfunctioning, then the control logic 40 may provide a control signal 30 effective to stop operation of the device.

Figure 4:
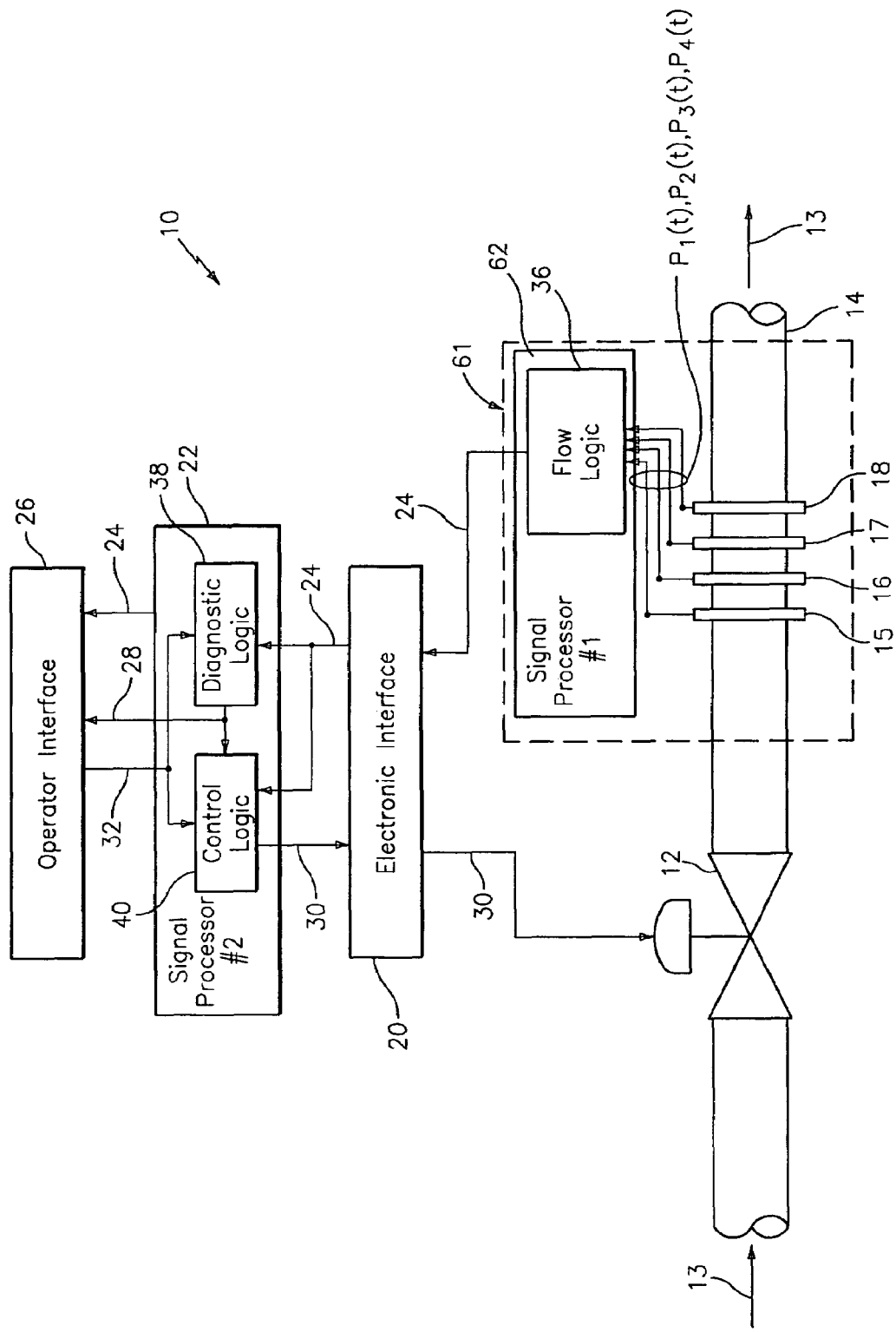
FIG. 4 is a schematic block diagram of the system for operating a process flow using another alternative flow meter in accordance with various embodiments of the present invention.

Referring to FIG. 4, system 10 is shown including an alternative flow meter 61, which includes a signal processor 62 configured to execute the flow logic 36. The signal processor 62 receives the pressure signals $P_1(t)$, $P_2(t)$, $P_3(t)$, $P_4(t)$ and applies this data to the flow logic 36 executed by the signal processor 62. Using this data, the flow logic 36 determines a parameter of the process flow, such as sound speed, mach number, consistency, composition, entrained air, density, mass flow rate, volumetric flow rate and others, in accordance with an algorithm. The signal processor 62 may then provide the determined flow parameter as a flow signal 24 to the signal processor 22, via electronic interface 20.

In the embodiment of FIG. 4, the diagnostic logic 38 executed by the signal processor 22 may process the flow signal 24 to diagnose the health of the device 12 and provide a diagnostic signal 28 indicative of the health of the device. The diagnostic logic 38 may compare the measured data to previously stored data or to input parameters 32 to diagnose or evaluate the changes between the measured and stored or input data.

In an open loop mode, the signal processor 22 may output the diagnostic signal 28 and the flow signal 24 to the operator interface 26. In a closed loop mode, the signal processor 22 may apply the flow signal 24, and/or the diagnostic signal 28 to the control logic 40. As previously described, the signal processor 22 provides the control signal 30 to at least one device 12 via the electronic interface 20 to change an operating parameter of at the least one device 12. The control logic 40 may, for example, compare the flow signal 24 to stored parameters, set points, or input parameters 32 to determine an appropriate control signal 30 for causing the appropriate operating condition of the one or more operating devices 12. For example, if fluid 13 flow is determined to be below a stored threshold value, control logic 40 may provide control signals 30 to valves and/or pumps in the flow process. In another example, if the diagnostic signal 28 indicates that a device is malfunctioning, then the control logic 40 may provide a control signal 30 effective to stop operation of the device.

In the system 10, it is contemplated that the electronic interface 20, signal processor 22, and operator interface 26 may be located remotely from the device 12 and any one or more of the flow meters 11, 51, and 61. For example, any one or more of the flow meters 11, 51, and 61 may be located on a plant floor along with the device 12, and the electronic interface 20, signal processor 22, and operator interface 26 may be located at an isolated control station. It is also contemplated that the electronic interface 20 and signal processor 22 are located proximate to any one or more flow meters 11, 51, and 61, with the operator interface being located remotely.

Figure 5:
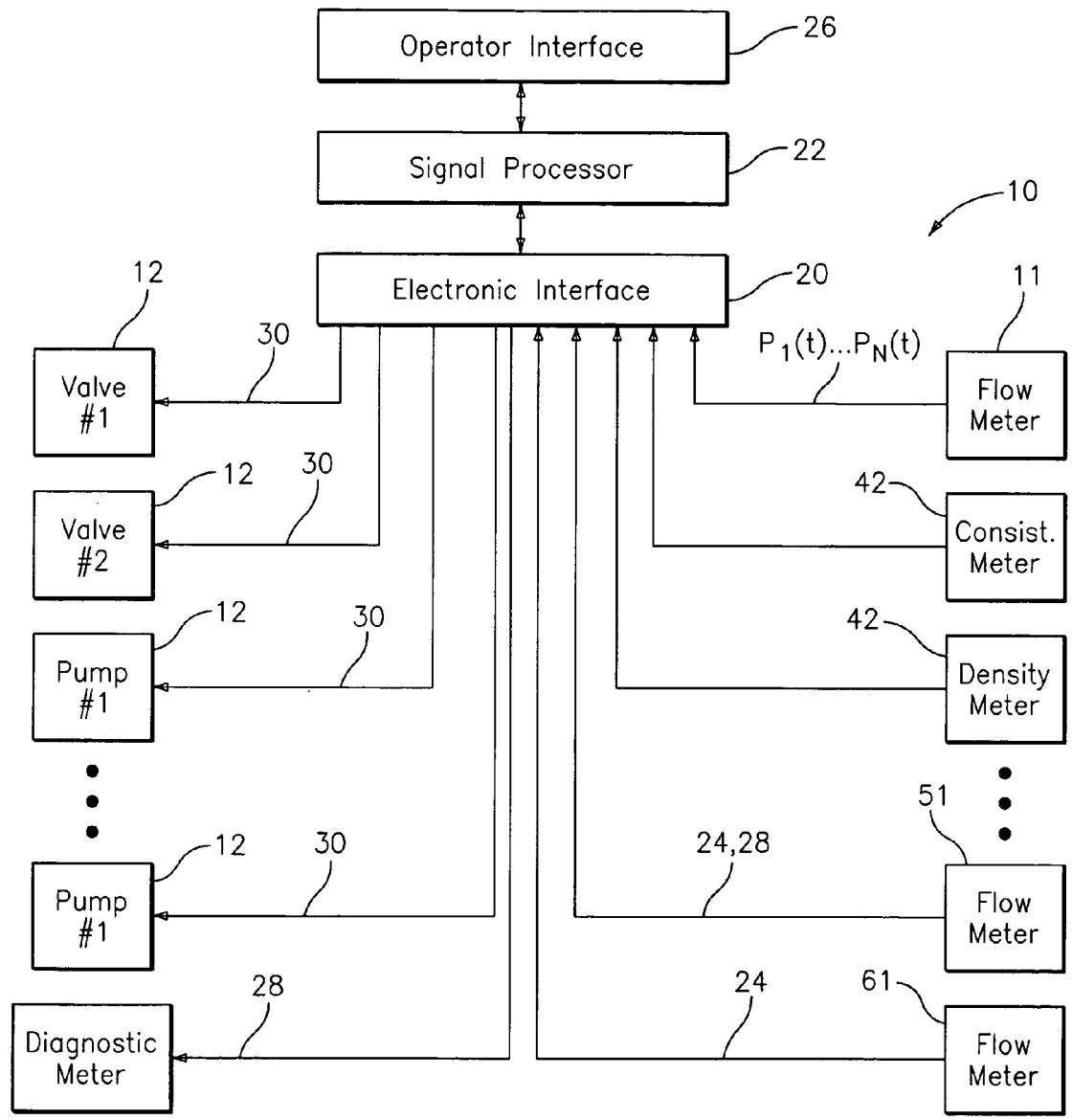
FIG. 5 is a schematic block diagram of the system including a plurality of meters and devices.

Referring to FIG. 5, it is further contemplated that the system 10 may monitor a plurality of flow meters comprising any combination of flow meters 11, 51 and 61. It is further contemplated that the system 10 may control a plurality of devices 12 in response to the signals received from the plurality of flow meters. The control system 10 may also monitor a plurality of standard meters 42, which may include consistency meters, density meters, standard flow meters, pressure sensors, temperature sensors, and the like, and control the plurality of devices 12 in response to signals received from these meters.

In the embodiment shown, the flow meters 11, 51, and 61, standard meters 42, and devices 12 separately communicate with the electronic interface 20; however, it is contemplated that all or a portion of the meters 11, 51, 61, and 42 may be connected to a common cable, with the signals from the connected meters 11, 51, 61, and 42 being multiplexed on the common cable using any known multiplexing technique. This multiplexed arrangement is similar to that found in the PlantWeb® architecture manufactured by Emerson Corporation.

It is contemplated that the flow meters 11, 51, and 61 each include the capability of providing multiplexed output in addition to the capability of providing parallel output. It is also contemplated that the flow meters 11, 51, and 61 each include the capability of communicating using various protocols and systems currently in use in the industrial sensing area. For example, the flow meters 11, 51, and 61 may provide conventional 4-20 mA output signals formatted to the open protocol HART® (Highway Addressable Remote Transducer) digital communications format. Similarly, communication from the flow meters 11, 51, and 61 may be performed with an open and interoperable protocol, such as FOUNDATION™ Fieldbus that provides a digital communication link among intelligent field level and control devices via electrical lines. In other examples, the flow meters 11 may be configured for use with other process protocols, including Device Bus, Sensor Bus, Profibus, Ethernet, and others.

The use of fiber optic based pressure sensors 15-18 (FIG. 1) in flow meters 11 makes the flow meters 11 particularly qualified for industrial applications requiring multiple sensors. The use of multiplexed flow meters 11 through the use of feedthroughs (or other known techniques) in a large multipoint process enables connectivity to the multiple flow meters 11 through a single fiber optic cable. Electronic sensors of the prior art require dedicated wiring to the electronic interface 20 and back to the sensor. For instance, a typical paper/pulp process control system that utilizes electronic flow meters of the prior art requires an electrical process loop to facilitate both a power signal to the transmitters and bi-directional communication.

Figure 6:
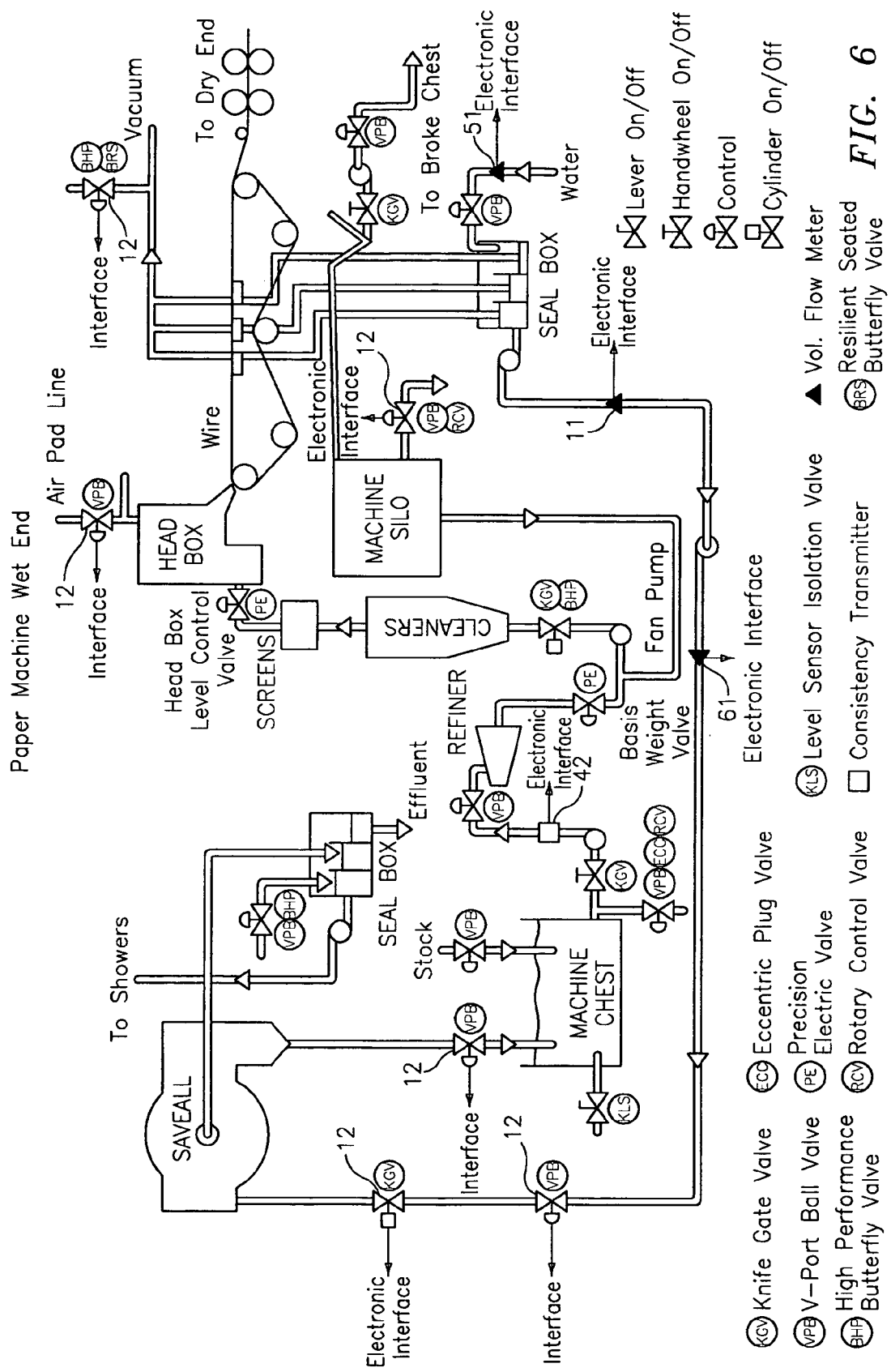
FIG. 6 is a schematic diagram of a paper machine wet end including a plurality of meters based on array-processing.

FIG. 6 shows the system 10 integrated in a pulp and paper application. Specifically, FIG. 6 illustrates a schematic diagram of a paper machine wet end including a plurality of flow meters 11, 51, and 61, other meters 42, and devices 12 as part of the system 10.

One will appreciate that the system 10 embodying the present invention may function as a monitoring system to provide information to operating personnel. Further, the system 10 may include additional intelligence to process the input data from the flow meters 10 and diagnose problems or undesirable changes in the process flow. The system 10 may be further programmed to identify these changes or problems and provide a control signal 30 to various devices 12 to change the flow rate, composition or otherwise optimize the flow process. One will appreciate that the system 10 may also control the flow of the process in response to an input from the operating personnel via input from the operator interface 26.

For any of the embodiments described herein, the pressure sensors 15-18, may be attached to the pipe by adhesive, glue, epoxy, tape or other suitable attachment means to ensure suitable contact between the sensor and the pipe 14. The pressure sensors 15-18 may alternatively be removable or permanently attached via known mechanical techniques such as mechanical fastener, spring loaded, clamped, clam shell arrangement, strapping or other equivalents. Alternatively, the pressure sensors 15-18 may be embedded in the pipe 14. The pressure sensors 15-18 may be selected from piezoelectric, piezoresistive, strain gauge, PVDF, optical sensors, ported ac pressure sensors, accelerometers, velocity sensors, and displacement sensors.

It is also within the scope of the present invention that any other strain sensing technique may be used to measure the variations in strain in the pipe 14, such as highly sensitive piezoelectric, electronic or electric, strain gages attached to or embedded in the pipe 14.

In certain embodiments of the present invention, a piezoelectronic pressure transducer may be used as one or more of the pressure sensors 15-18 and it may measure the unsteady (or dynamic or ac) pressure variations inside the pipe 14 by measuring the pressure levels inside of the pipe. In one embodiment of the present invention, the pressure sensors 15-18 comprise pressure sensors manufactured by PCB Piezotronics. In one pressure sensor there are integrated circuit piezoelectric voltage mode-type sensors that feature built-in microelectronic amplifiers, and convert the high-impedance charge into a low-impedance voltage output. Specifically, a Model 106B manufactured by PCB Piezotronics is used which is a high sensitivity, acceleration compensated integrated circuit piezoelectric quartz pressure sensor suitable for measuring low pressure acoustic phenomena in hydraulic and pneumatic systems. It has the unique capability to measure small pressure changes of less than 0.001 psi under high static conditions. The 106B has a 300 mV/psi sensitivity and a resolution of 91 dB (0.0001 psi).

The pressure sensors 15-18 may incorporate a built-in MOSFET microelectronic amplifier to convert the high-impedance charge output into a low-impedance voltage signal. In this embodiment, the pressure sensors 15-18 are powered from a constant-current source and can operate over long coaxial or ribbon cable without signal degradation. Power to operate integrated circuit piezoelectric sensors generally takes the form of a low-cost, 24 to 27 VDC, 2 to 20 mA constant-current supply. The system 10 of the present invention may incorporate constant-current power for directly powering integrated circuit piezoelectric pressure sensors 15-18.

Furthermore the present invention contemplates that each of the pressure sensors 15-18 may include a piezoelectric material to measure the unsteady pressures of the fluid 13. The piezoelectric material, such as the polymer, polarized fluoropolymer, polyvinylidene fluoride (PVDF), measures the strain induced within the process pipe 14 due to unsteady pressure variations within fluid 13. Strain within the pipe 14 is transduced to an output voltage or current by the attached piezoelectric pressure sensors 15-18.

Preferably, the PVDF material forming each of the pressure sensors 15-18 is adhered to the outer surface of a steel strap that extends around and clamps onto the outer surface of the pipe 14. The piezoelectric pressure sensors 15-18 are typically conformal to allow complete or nearly complete circumferential measurement of induced strain. The pressure sensors 15-18 can be formed from PVDF films, co-polymer films, or flexible PZT sensors, similar to that described in "Piezo Film Sensors technical Manual" provided by Measurement Specialties, Inc., which is incorporated herein by reference. The advantages of this technique are the following:

1. Non-intrusive flow rate measurements
2. Low cost
3. Measurement technique requires no excitation source. Ambient flow noise is used as a source.
4. Flexible piezoelectric sensors can be mounted in a variety of configurations to enhance signal detection schemes. These configurations include a) co-located sensors, b) segmented sensors with opposing polarity configurations, c) wide sensors to enhance acoustic signal detection and minimize vortical noise detection, d) tailored sensor geometries to minimize sensitivity to pipe modes, e) differencing of sensors to eliminate acoustic noise from vortical signals.
5. Higher Temperatures (140 C) (co-polymers)

Diagnostic Logic

Figure 7:
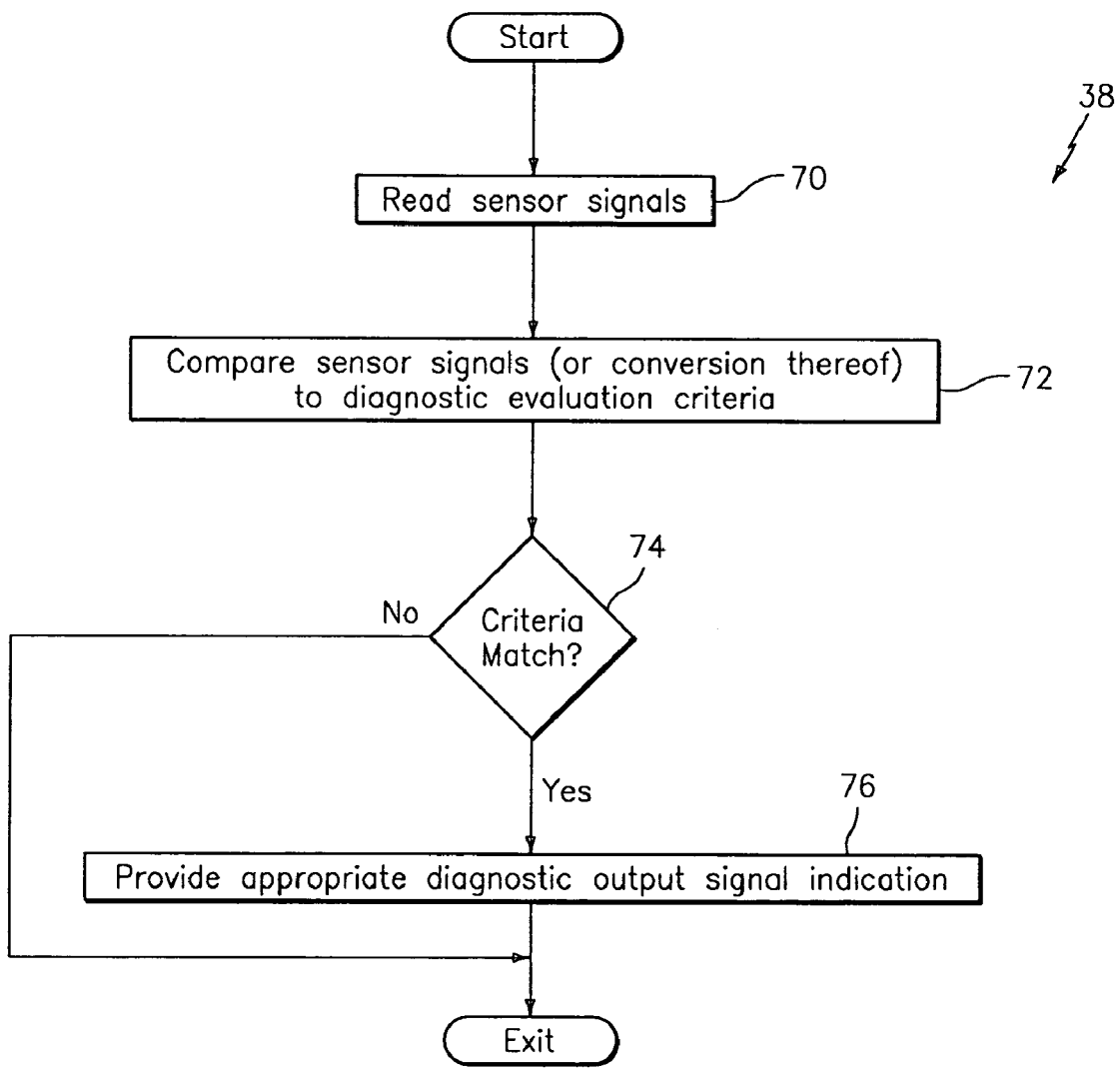
FIG. 7 is a flow chart depicting operation of a Diagnostic Logic used in the system of the present invention.

Referring to FIG. 7, the diagnostic logic 38 measures the sensor input signals (or evaluation input signals), which may include one or more of the pressure signals $P_1(t)$, $P_2(t)$, $P_3(t)$, $P_4(t)$ and the flow signal 24, at a step 70 (FIG. 7). Next, the diagnostic logic 38 compares the evaluation input signals to a diagnostic evaluation criteria at a step 72, discussed hereinafter. Then, a step 74 checks if there is a match, and if so, a step 76 provides a diagnostic signal 28 indicative of the diagnostic condition that has been detected and may also provide information identifying the diagnosed device. If there is not a criteria match in step 74, the diagnostic logic 38 exits.

Where the evaluation input signal is the flow signal 24, as in the embodiment of FIG. 4 for example, the diagnostic evaluation criteria may be based on a threshold value of the flow signal 24. For example, the threshold value may be indicative of a maximum or minimum sound speed, mach number, consistency, composition, entrained air, density, mass flow rate, volumetric flow rate, or the like.

Where the evaluation input signal includes one or more pressure signals $P_1(t)$, $P_2(t)$, $P_3(t)$, $P_4(t)$, the diagnostic evaluation criteria may be a threshold (maximum or minimum) pressure. Alternatively, the diagnostic evaluation criteria may be based on an acoustic signature, or a convective property (i.e., a property that propagates or convects with the flow). For example, the diagnostic logic 38 may monitor the acoustic signature of any upstream or downstream device (e.g., motor, fan, pump, generator, engine, gear box, belt drive, pulley, hanger, clamp, actuator, valve, meter, or other machinery, equipment or component). Further, the data from the array of sensors 15-18 may be processed in any domain, including the frequency/spatial domain, the temporal/spatial domain, the temporal/wave-number domain, or the wave-number/frequency (k-ω) domain or other domain, or any combination of one or more of the above. As such, any known array processing technique in any of these or other related domains may be used if desired.

For example, for three unsteady pressure signals, the equations in the frequency/spatial domain equation would be: $P(x,\omega) = Ae^{-ik_rx} + Be^{+ik_rx}$; the temporal/spatial domain would be: $P(x,t) = (Ae^{-ik_rx} + Be^{+ik_rx})e^{i\omega t}$; and the k-ω domain (taking the spatial Fourier transform) would be:

$$P(k, \omega) = \frac{1}{2\pi}\int_{-\infty}^{+\infty} P(x, \omega)e^{ikx}dx$$
$$= A(\omega)\delta\left(k - \frac{\omega}{a}\right) + B(\omega)\delta\left(k + \frac{\omega}{a}\right)$$

where k is the wave number, a is the speed of sound of the material, x is the location along the pipe, ω is frequency (in rad/sec, where $\omega = 2\pi f$), and δ is the Dirac delta function, which shows a spatial/temporal mapping of the acoustic field in the k-ω plane.

Any technique known in the art for using a spatial (or phased) array of sensors to determine the acoustic or convective fields, beam forming, or other signal processing techniques, may be used to provide an input evaluation signal to be compared to the diagnostic evaluation criteria.

Flow Logic

Velocity Processing

Figure 8:
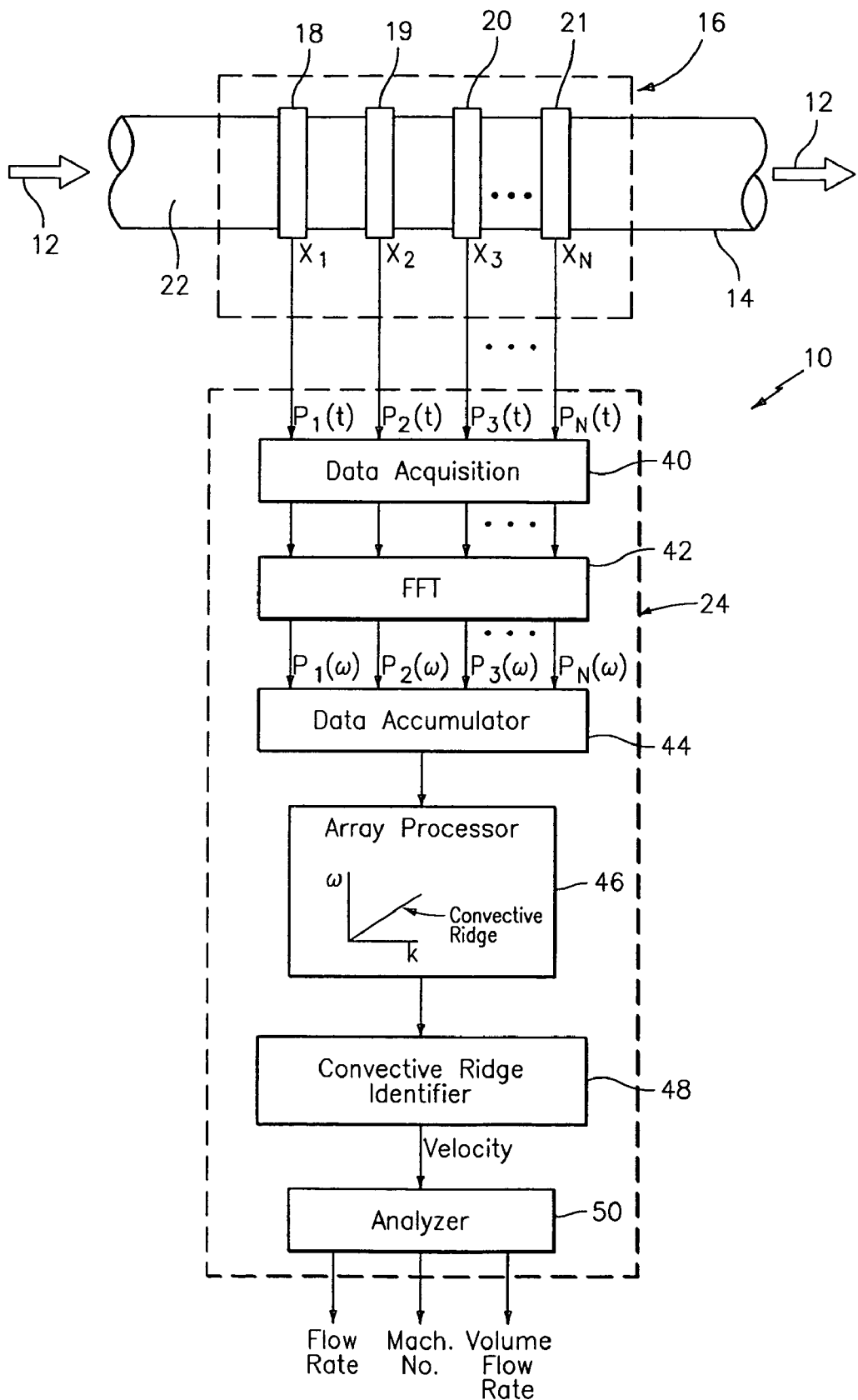
FIG. 8 is a block diagram of a first embodiment of a flow logic used in the apparatus of the present invention.

Referring to FIG. 8, an example of flow logic 36 is shown. As previously described, each array of at least two sensors located at two locations $x_1, x_2$ axially along the pipe 14 sense respective stochastic signals propagating between the sensors within the pipe at their respective locations. Each sensor provides a signal indicating an unsteady pressure at the location of each sensor, at each instant in a series of sampling instants. One will appreciate that each sensor array may include more than two sensors distributed at locations $x_1 \ldots x_N$. The pressure generated by the convective pressure disturbances (e.g., eddies 120, see FIG. 9) may be measured through strained-based sensors and/or pressure sensors. The sensors provide analog pressure time-varying signals $P_1(t)$, $P_2(t), P_3(t), P_N(t)$ to the flow logic 36.

The flow logic 36 processes the signals $P_1(t), P_2(t), P_3(t), P_N(t)$ to first provide output signals (parameters) 21 indicative of the pressure disturbances that convect with the fluid (process flow) 13, and subsequently, provide output signals in response to pressure disturbances generated by convective waves propagating through the fluid 13, such as velocity, Mach number and volumetric flow rate of the process flow 13. The flow logic 36 processes the pressure signals to first provide output signals indicative of the pressure disturbances that convect with the process flow 13, and subsequently, provide output signals in response to pressure disturbances generated by convective waves propagating through the process flow 13, such as velocity, Mach number and volumetric flow rate of the process flow 13.

The flow logic 36 receives the pressure signals from the array of sensors 15-18. A data acquisition unit 126 (e.g., A/D converter) converts the analog signals to respective digital signals. The FFT logic 128 calculates the Fourier transform of the digitized time-based input signals $P_1(t)$-$P_N(t)$ and provides complex frequency domain (or frequency based) signals $P_1(\omega), P_2(\omega), P_3(\omega), P_N(\omega)$ indicative of the frequency content of the input signals. Instead of FFT's, any other technique for obtaining the frequency domain characteristics of the signals $P_1(t)$-$P_N(t)$, may be used. For example, the cross-spectral density and the power spectral density may be used to form one or more frequency domain transfer functions (or frequency responses or ratios) discussed hereinafter.

One technique of determining the convection velocity of the turbulent eddies 120 within the process flow 13 is by characterizing a convective ridge of the resulting unsteady pressures using an array of sensors or other beam forming techniques, similar to that described in U.S. Pat. No. 6,889,562 and U.S. Pat. No. 6,609,069, which are incorporated herein by reference.

A data accumulator 130 accumulates the frequency signals $P_1(\omega)$-$P_N(\omega)$ over a sampling interval, and provides the data to an array processor 132, which performs a spatial-temporal (two-dimensional) transform of the sensor data, from the xt domain to the k-ω domain, and then calculates the power in the k-ω plane, as represented by a k-ω plot.

The array processor 132 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k = 2\pi/\lambda$ where λ is the wavelength of a spectral component, and corresponding angular frequencies given by $\omega = 2\pi\nu$.

The prior art teaches many algorithms of use in spatially and temporally decomposing a signal from a phased array of sensors, and the present invention is not restricted to any particular algorithm. One particular adaptive array processing algorithm is the Capon method/algorithm. While the Capon method is described as one method, the present invention contemplates the use of other adaptive array processing algorithms, such as the MUSIC algorithm. The present invention recognizes that such techniques can be used to determine flow rate, i.e. that the signals caused by a stochastic parameter convecting with a flow are time stationary and have a coherence length long enough that it is practical to locate sensor units apart from each other and yet still be within the coherence length.

Convective characteristics or parameters have a dispersion relationship that can be approximated by the straight-line equation, $$k=\omega/u,$$

where u is the convection velocity (flow velocity). A plot of k-ω pairs is obtained from a spectral analysis of sensor samples associated with convective parameters. The pairings are portrayed so that the energy of the disturbance spectrally corresponding to the pairings can be described as a substantially straight ridge, a ridge that in turbulent boundary layer theory is called a convective ridge. What is being sensed are not discrete events of turbulent eddies, but rather a continuum of possibly overlapping events forming a temporally stationary, essentially white process over the frequency range of interest. In other words, the convective eddies 120 are distributed over a range of length scales and hence temporal frequencies.

To calculate the power in the k-ω plane, as represented by a k-ω plot (see FIG. 10) of either of the signals, the array processor 132 determines the wavelength and so the (spatial) wavenumber k, and also the (temporal) frequency and so the angular frequency ω, of various of the spectral components of the stochastic parameter. There are numerous algorithms available in the public domain to perform the spatial/temporal decomposition of arrays of sensor units 15-18.

The present invention may use temporal and spatial filtering to precondition the signals to effectively filter out the common mode characteristics $P_{common\ mode}$ and other long wavelength (compared to the sensor spacing) characteristics in the pipe 14 by differencing adjacent sensors 15 and retaining a substantial portion of the stochastic parameter associated with the flow field and any other short wavelength (compared to the sensor spacing) low frequency stochastic parameters.

Figure 9:
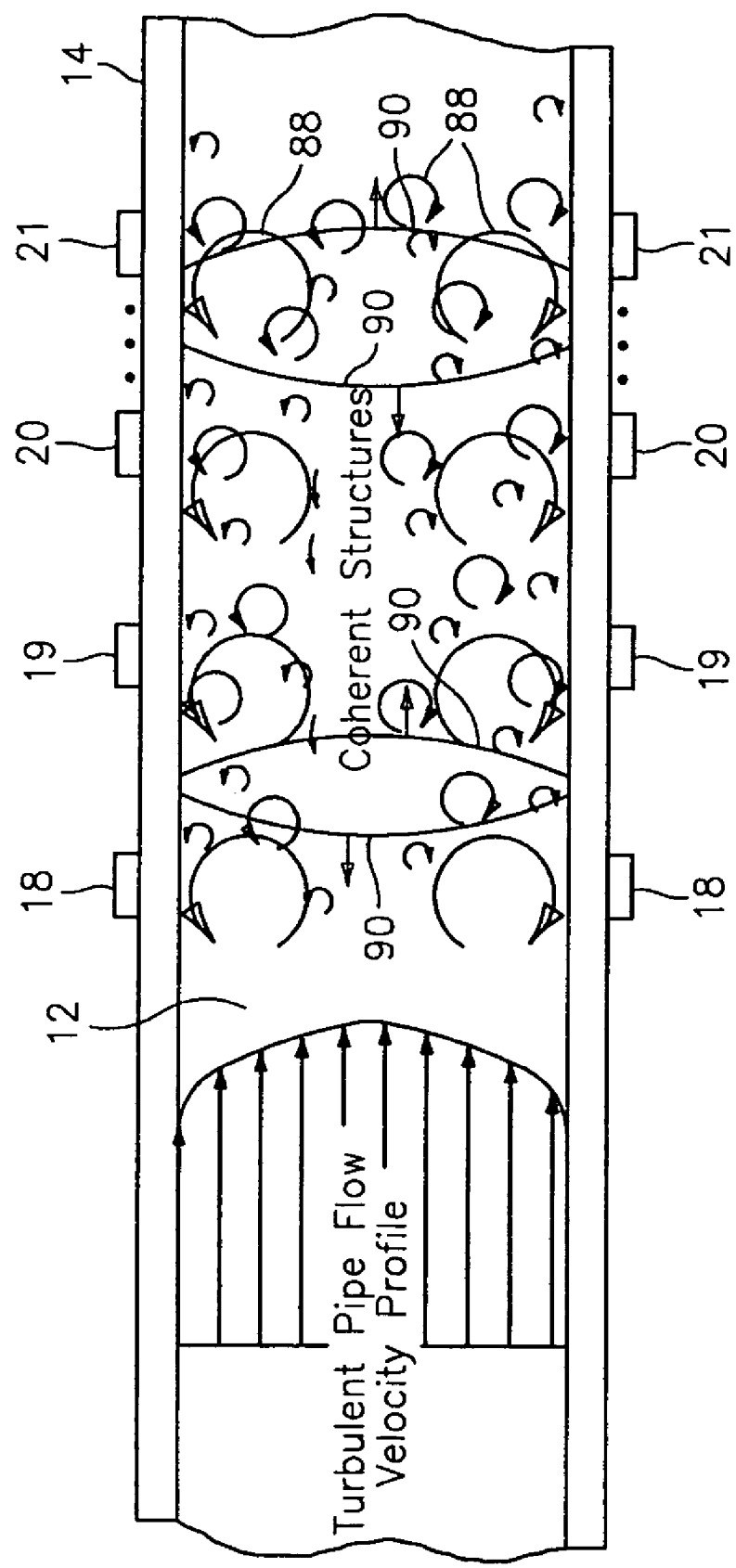
FIG. 9 is a cross-sectional view of a pipe having coherent structures therein, in accordance with the present invention.
Figure 10:
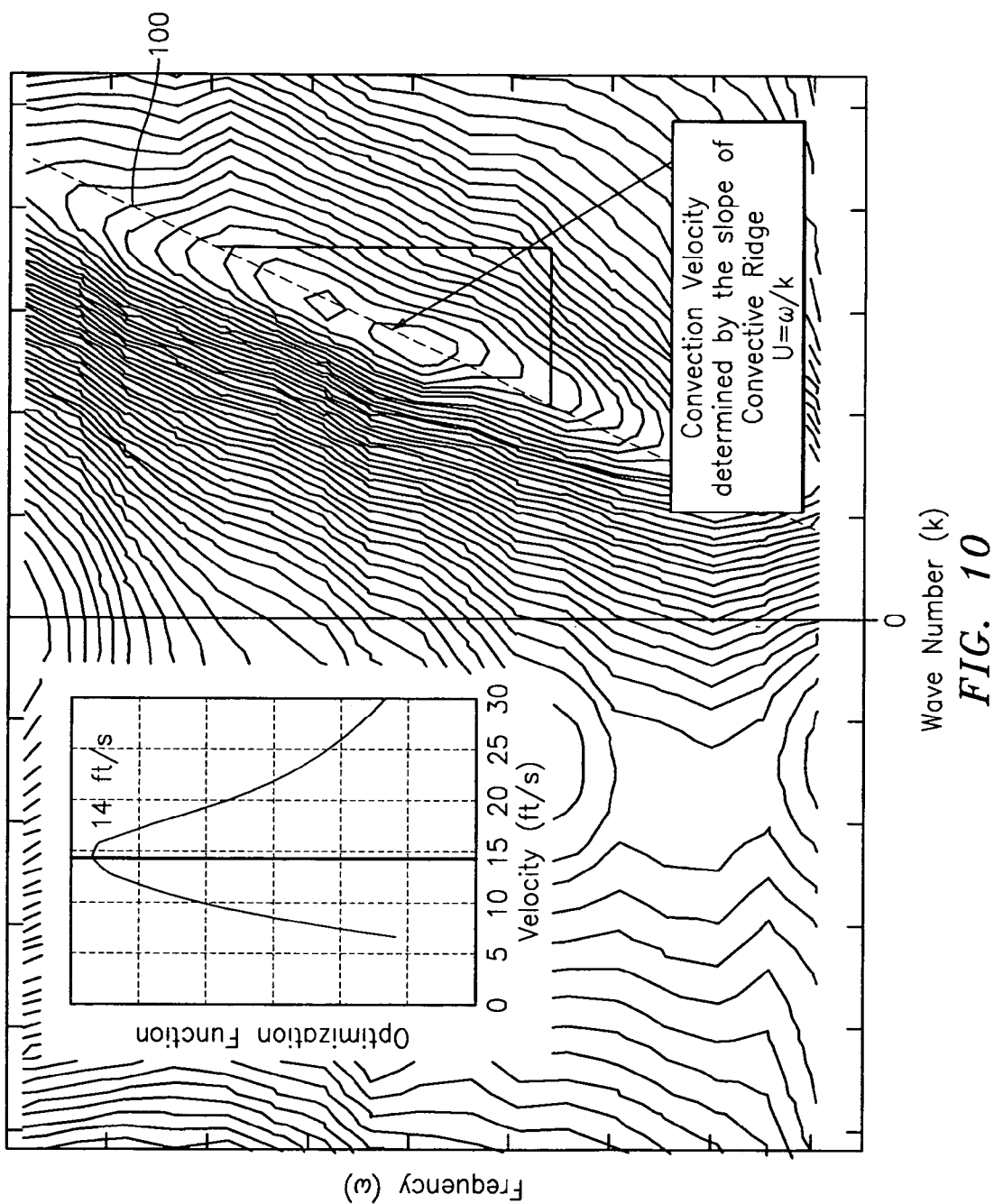
FIG. 10 a kω plot of data processed from an apparatus embodying the present invention that illustrates slope of the convective ridge, and a plot of the optimization function of the convective ridge, in accordance with the present invention.

In the case of suitable turbulent eddies 120 (see FIG. 9) being present, the power in the k-ω plane shown in a k-ω plot of FIG. 10 shows a convective ridge 124. The convective ridge represents the concentration of a stochastic parameter that convects with the flow and is a mathematical manifestation of the relationship between the spatial variations and temporal variations described above. Such a plot will indicate a tendency for k-ω pairs to appear more or less along a line 124 with some slope, the slope indicating the flow velocity.

Once the power in the k-ω plane is determined, a convective ridge identifier 134 uses one or another feature extraction method to determine the location and orientation (slope) of any convective ridge 124 present in the k-ω plane. In one embodiment, a so-called slant stacking method is used, a method in which the accumulated frequency of k-ω pairs in the k-ω plot along different rays emanating from the origin are compared, each different ray being associated with a different trial convection velocity (in that the slope of a ray is assumed to be the flow velocity or correlated to the flow velocity in a known way). The convective ridge identifier 134 provides information about the different trial convection velocities, information referred to generally as convective ridge information.

The analyzer 136 examines the convective ridge information including the convective ridge orientation (slope). Assuming the straight-line dispersion relation given by $k=\omega/u$, the analyzer 136 determines the flow velocity, Mach number and/or volumetric flow, which are output as parameters 21. The volumetric flow is determined by multiplying the cross-sectional area of the inside of the pipe with the velocity of the process flow.

Some or all of the functions within the flow logic 36 may be implemented in software (using a microprocessor or computer) and/or firmware, or may be implemented using analog and/or digital hardware, having sufficient memory, interfaces, and capacity to perform the functions described herein.

Speed of Sound (SOS) Processing

Figure 11:
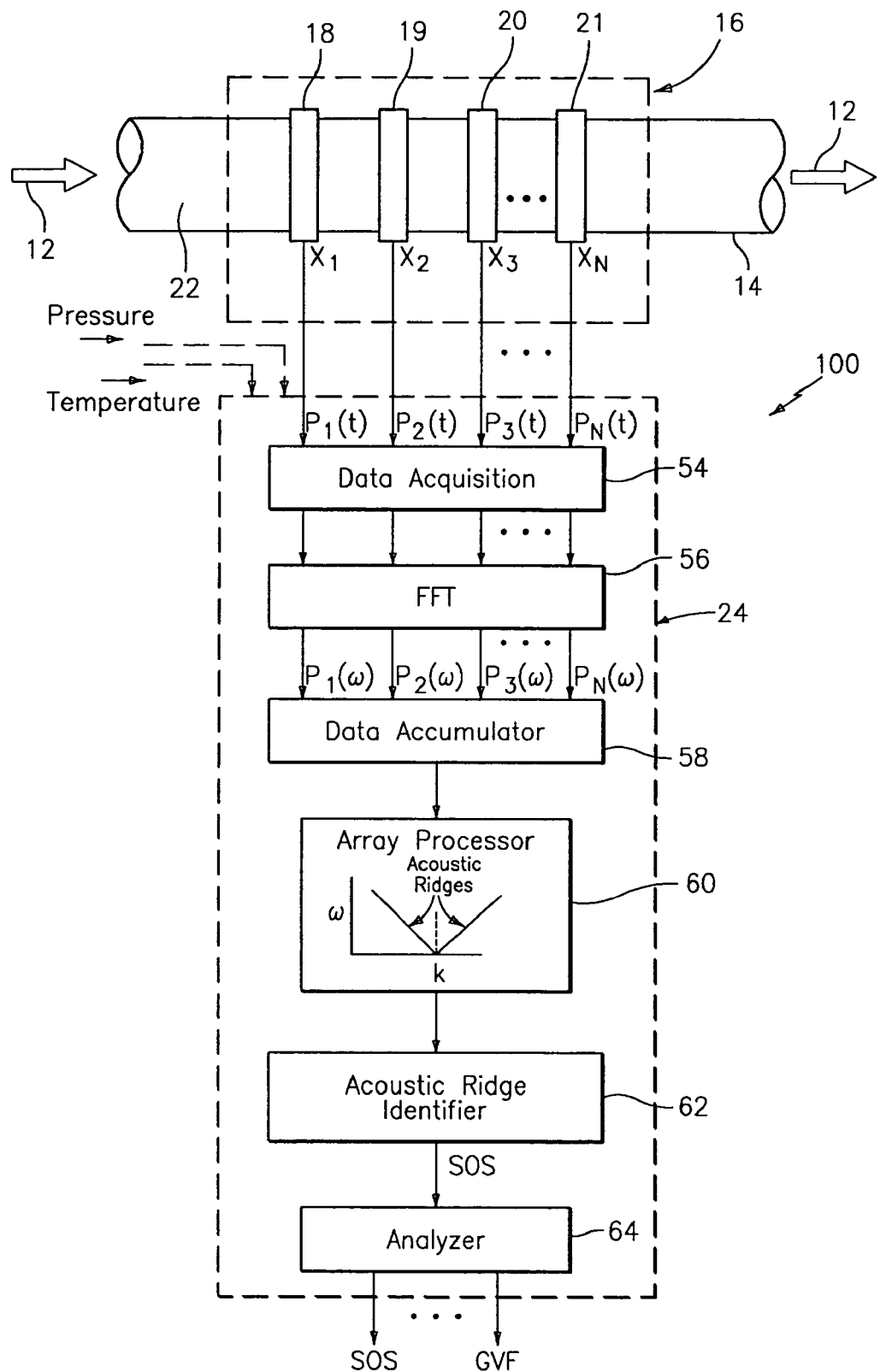
FIG. 11 is a block diagram of a second embodiment of a flow logic used in the apparatus of the present invention.
Figure 12:
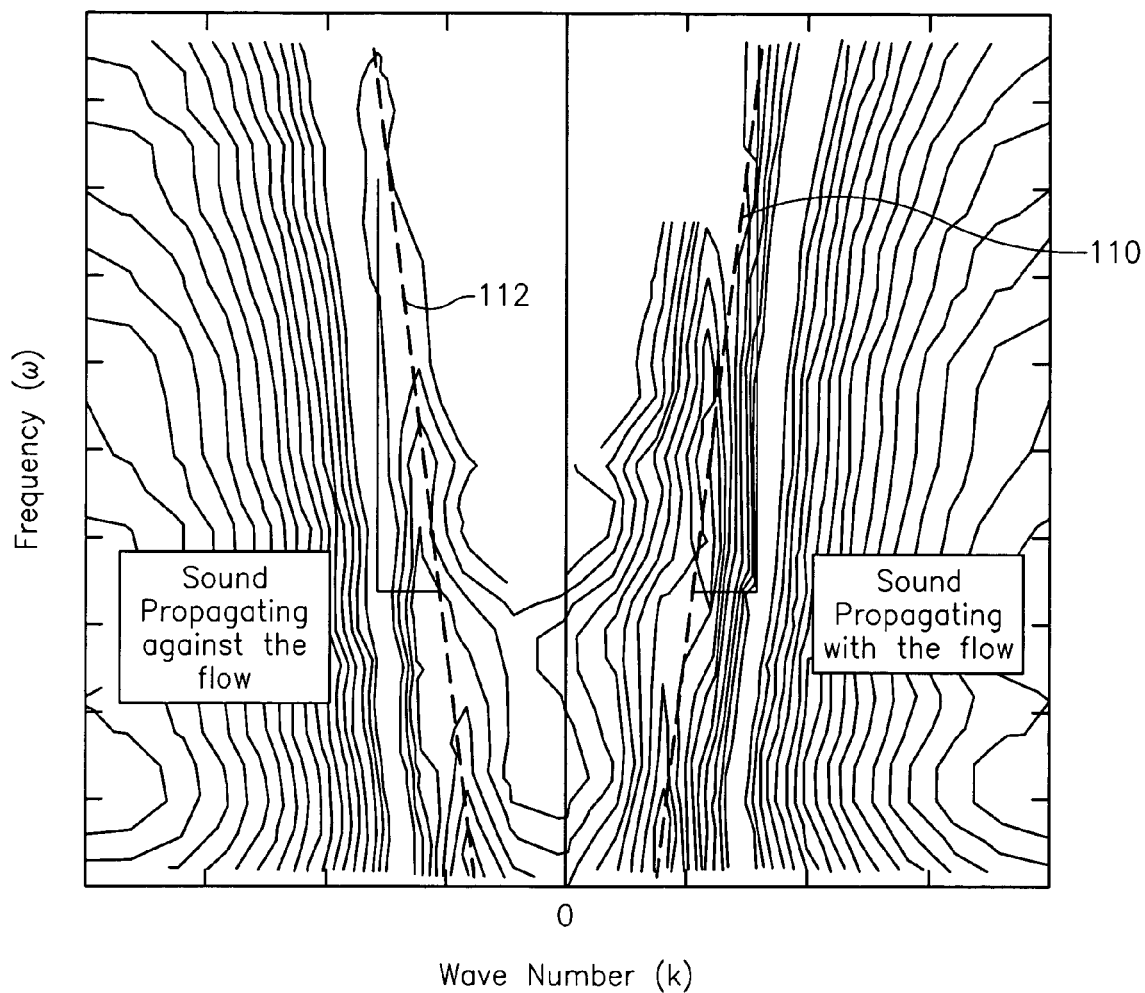
FIG. 12 a kω plot of data processed from an apparatus embodying the present invention that illustrates slope of the acoustic ridges, in accordance with the present invention.

Referring to FIG. 11, another example of flow logic 36 is shown. While the examples of FIG. 11 and FIG. 12 are shown separately, it is contemplated that the flow logic 36 may perform all of the functions described with reference to FIG. 11 and FIG. 12. As previously described, the array of at least two sensors located at two at least two locations $x_1,x_2$ axially along the pipe 14 sense respective stochastic signals propagating between the sensors within the pipe at their respective locations. Each sensor provides a signal indicating an unsteady pressure at the location of each sensor, at each instant in a series of sampling instants. One will appreciate that the sensor array may include more than two pressure sensors distributed at locations $x_1 \ldots x_N$. The pressure generated by the acoustic pressure disturbances (e.g., acoustic waves 122, see FIG. 9) may be measured through strained-based sensors and/or pressure sensors. The sensors provide analog pressure time-varying signals $P_1(t),P_2(t),P_3(t),P_N(t)$ to the flow logic 36. The flow logic 36 processes the signals $P_1(t),P_2(t),P_3(t),P_N(t)$ to first provide output signals indicative of the speed of sound propagating through the fluid (process flow) 13, and subsequently, provide output signals in response to pressure disturbances generated by acoustic waves propagating through the process flow 13, such as velocity, Mach number and volumetric flow rate of the process flow 13.

The flow logic 36 receives the pressure signals from the array of sensors 15-18. A data acquisition unit 138 digitizes pressure signals $P_1(t)$-$P_N(t)$ associated with the acoustic waves 122 propagating through the pipe 14. Similarly to the FFT logic 128 of FIG. 8, an FFT logic 140 calculates the Fourier transform of the digitized time-based input signals $P_1(t)$-$P_N(t)$ and provide complex frequency domain (or frequency based) signals $P_1(\omega),P_2(\omega),P_3(\omega),P_N(\omega)$ indicative of the frequency content of the input signals.

A data accumulator 142 accumulates the frequency signals $P_1(\omega)$-$P_N(\omega)$ over a sampling interval, and provides the data to an array processor 144, which performs a spatial-temporal (two-dimensional) transform of the sensor data, from the xt domain to the k-ω domain, and then calculates the power in the k-ω plane, as represented by a k-ω plot.

To calculate the power in the k-ω plane, as represented by a k-ω plot (see FIG. 12) of either the signals or the differenced signals, the array processor 144 determines the wavelength and so the (spatial) wavenumber k, and also the (temporal) frequency and so the angular frequency ω, of various of the spectral components of the stochastic parameter. There are numerous algorithms available in the public domain to perform the spatial/temporal decomposition of arrays of sensor units 15-18.

In the case of suitable acoustic waves 122 being present in both axial directions, the power in the k-ω plane shown in a k-ω plot of FIG. 12 so determined will exhibit a structure that is called an acoustic ridge 150, 152 in both the left and right planes of the plot, wherein one of the acoustic ridges 150 is indicative of the speed of sound traveling in one axial direction and the other acoustic ridge 152 being indicative of the speed of sound traveling in the other axial direction. The acoustic ridges represent the concentration of a stochastic parameter that propagates through the flow and is a mathematical manifestation of the relationship between the spatial variations and temporal variations described above. Such a plot will indicate a tendency for k-ω pairs to appear more or less along a line 150, 152 with some slope, the slope indicating the speed of sound.

The power in the k-ω plane so determined is then provided to an acoustic ridge identifier 146, which uses one or another feature extraction method to determine the location and orientation (slope) of any acoustic ridge present in the left and right k-ω plane. The velocity may be determined by using the slope of one of the two acoustic ridges 150, 152 or averaging the slopes of the acoustic ridges 150, 152.

Finally, information including the acoustic ridge orientation (slope) is used by an analyzer 148 to determine the flow parameters relating to measured speed of sound, such as the consistency or composition of the flow, the density of the flow, the average size of particles in the flow, the air/mass ratio of the flow, gas volume fraction of the flow, the speed of sound propagating through the flow, and/or the percentage of entrained air within the flow.

Similar to the array processor 132 of FIG. 8, the array processor 144 uses standard so-called beam forming, array processing, or adaptive array-processing algorithms, i.e. algorithms for processing the sensor signals using various delays and weighting to create suitable phase relationships between the signals provided by the different sensors, thereby creating phased antenna array functionality. In other words, the beam forming or array processing algorithms transform the time domain signals from the sensor array into their spatial and temporal frequency components, i.e. into a set of wave numbers given by $k=2\pi/\lambda$ where $\lambda$ is the wavelength of a spectral component, and corresponding angular frequencies given by $\omega=2\pi\nu$.

One such technique of determining the speed of sound propagating through the process flow 13 is using array processing techniques to define an acoustic ridge in the k-ω plane as shown in FIG. 12. The slope of the acoustic ridge is indicative of the speed of sound propagating through the process flow 13. The speed of sound (SOS) is determined by applying sonar arraying processing techniques to determine the speed at which the one dimensional acoustic waves propagate past the axial array of unsteady pressure measurements distributed along the pipe 14.

The flow logic 36 of the present embodiment measures the speed of sound (SOS) of one-dimensional sound waves propagating through the process flow 13 to determine the gas volume fraction of the process flow 13. It is known that sound propagates through various mediums at various speeds in such fields as SONAR and RADAR fields. The speed of sound propagating through the pipe 14 and process flow 13 may be determined using a number of known techniques, such as those set forth in U.S. patent application Ser. No. 09/344,094, filed Jun. 25, 1999, now U.S. Pat. No. 6,354,147; U.S. patent application Ser. No. 10/795,111, filed Mar. 4, 2004, now U.S. Pat. No. 7,146,864; U.S. patent application Ser. No. 09/997,221, filed Nov. 28, 2001, now U.S. Pat. No. 6,587,798; U.S. patent application Ser. No. 10/007,749, filed Nov. 7, 2001, now U.S. Pat. No. 6,732,575; and U.S. patent application Ser. No. 10/762,410, filed Jan. 21, 2004, now U.S. Pat. No. 7,062,976, each of which are incorporated herein by reference.

While the sonar-based flow meter using an array of sensors 15-18 to measure the speed of sound of an acoustic wave propagating through the mixture is shown and described, one will appreciate that any means for measuring the speed of sound of the acoustic wave may used to determine the entrained gas volume fraction of the mixture/fluid or other characteristics of the flow described hereinbefore.

The analyzer 148 of the flow logic 36 provides output parameters 21 indicative of characteristics of the process flow 13 that are related to the measured speed of sound (SOS) propagating through the process flow 13. For example, to determine the gas volume fraction (or phase fraction), the analyzer 148 assumes a nearly isothermal condition for the process flow 13. As such the gas volume fraction or the void fraction is related to the speed of sound by the following quadratic equation:

$$Ax^2+Bx+C=0$$

wherein x is the speed of sound, $A=1+rg/rl*(K_{eff}/P-1)-K_{eff}/P$, $B=K_{eff}/P-2+rg/rl$; $C=1-K_{eff}/rl*a_{meas}{}^\wedge 2)$; Rg=gas density, rl=liquid density, $K_{eff}$=effective K (modulus of the liquid and pipewall), P=pressure, and $a_{meas}$=measured speed of sound.

Effectively, $$\text{Gas Volume Fraction } (GVF)=(-B+\text{sqrt}(B^\wedge 2-4*A*C))/(2*A)$$

Alternatively, the sound speed of a mixture can be related to volumetric phase fraction ($\phi_i$) of the components and the sound speed (a) and densities ($\rho$) of the component through the Wood equation.

$$\frac{1}{\rho_{mix}a_{mix\infty}^2} = \sum_{i=1}^{N}\frac{\phi_i}{\rho_i a_i^2} \text{ where } \rho_{mix} = \sum_{i=1}^{N}\rho_i\phi_i$$

One dimensional compression waves propagating within a process flow 13 contained within a pipe 14 exert an unsteady internal pressure loading on the pipe. The degree to which the pipe displaces as a result of the unsteady pressure loading influences the speed of propagation of the compression wave. The relationship among the infinite domain speed of sound and density of a mixture; the elastic modulus (E), thickness (t), and radius (R) of a vacuum-backed cylindrical conduit; and the effective propagation velocity ($a_{eff}$) for one dimensional compression is given by the following expression:

$$a_{eff} = \frac{1}{\sqrt{1/a_{mix\infty}^2 + \rho_{mix}\frac{2R}{Et}}} \quad (\text{eq 1})$$

Figure 13:
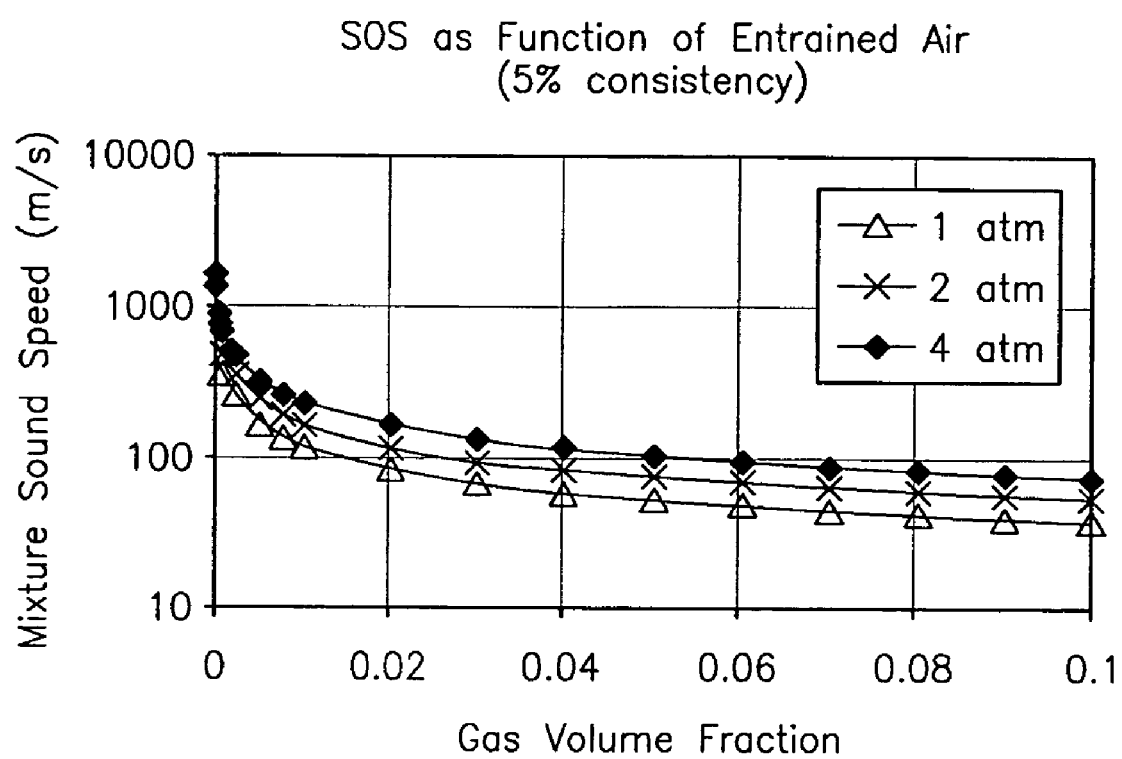
FIG. 13 is a plot of mixture sound speed as a function of gas volume fraction for a 5% consistency slurry over a range of process pressures, in accordance with the present invention.

The mixing rule essentially states that the compressibility of a process flow ($1/(\rho a^2)$) is the volumetrically-weighted average of the compressibilities of the components. For a process flow 13 consisting of a gas/liquid mixture at pressure and temperatures typical of paper and pulp industry, the compressibility of gas phase is orders of magnitudes greater than that of the liquid. Thus, the compressibility of the gas phase and the density of the liquid phase primarily determine mixture sound speed, and as such, it is necessary to have a good estimate of process pressure to interpret mixture sound speed in terms of volumetric fraction of entrained gas. The effect of process pressure on the relationship between sound speed and entrained air volume fraction is shown in FIG. 13.

As described hereinbefore, the flow logic 36 of the present embodiment includes the ability to accurately determine the average particle size of a particle/air or droplet/air mixture within the pipe 14 and the air to particle ratio. Provided there is no appreciable slip between the air and the solid coal particle, the propagation of one dimensional sound wave through multiphase mixtures is influenced by the effective mass and the effective compressibility of the mixture. For an air transport system, the degree to which the no-slip assumption applies is a strong function of particle size and frequency. In the limit of small particles and low frequency, the no-slip assumption is valid. As the size of the particles increases and the frequency of the sound waves increase, the non-slip assumption becomes increasing less valid. For a given average particle size, the increase in slip with frequency causes dispersion, or, in other words, the sound speed of the mixture to change with frequency. With appropriate calibration the dispersive characteristic of a process flow 13 will provide a measurement of the average particle size, as well as, the air to particle ratio (particle/fluid ratio) of the process flow 13.

In accordance with the present invention the dispersive nature of the system utilizes a first principles model of the interaction between the air and particles. This model is viewed as being representative of a class of models that seek to account for dispersive effects. Other models could be used to account for dispersive effects without altering the intent of this disclosure (for example, see the paper titled "Viscous Attenuation of Acoustic Waves in Suspensions" by R. L. Gibson, Jr. and M. N. Toksöz), which is incorporated herein by reference. The model allows for slip between the local velocity of the continuous fluid phase and that of the particles.

The following relation can be derived for the dispersive behavior of an idealized fluid particle mixture.

$$a_{mix}(\omega) = a_f \sqrt{\frac{1}{1 + \frac{\varphi_p \rho_p}{\rho_f \left(1 + \omega^2 \frac{\rho_p^2 v_p^2}{K^2}\right)}}}$$

In the above relation, the fluid SOS, density ($\rho$) and viscosity ($\phi$) are those of the pure phase fluid, $v_p$ is the volume of individual particles and $\phi_p$ is the volumetric phase fraction of the particles in the mixture.

Figure 14:
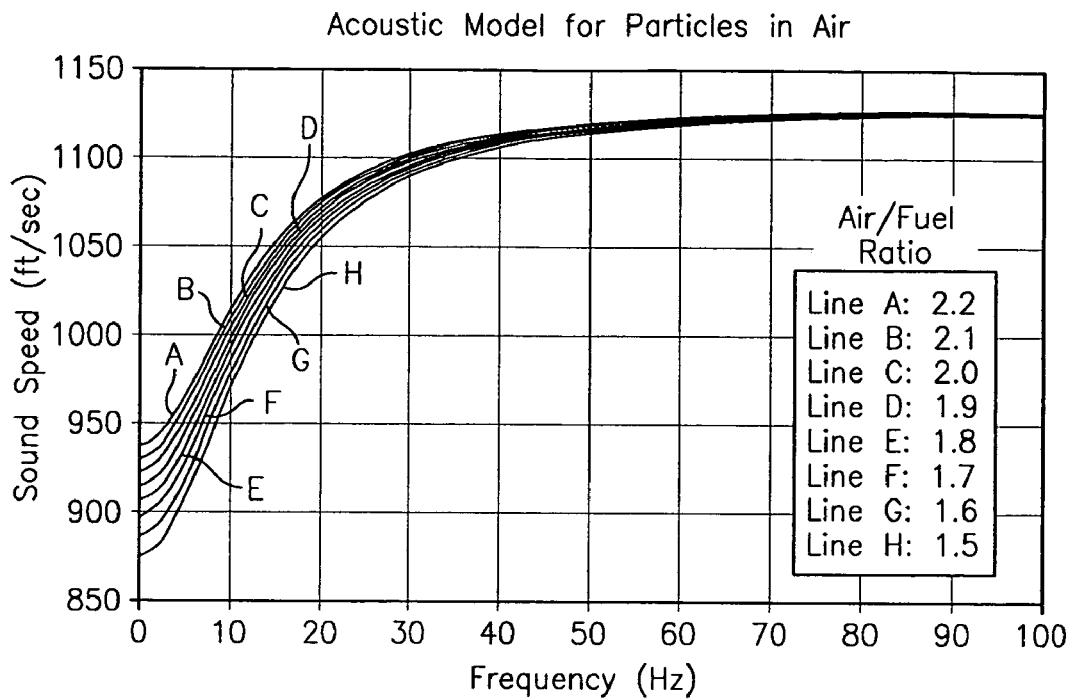
FIG. 14 is a plot of sound speed as a function of frequency for air/particle mixtures with fixed particle size and varying air-to-particle mass ratio in accordance with the present invention.
Figure 15:
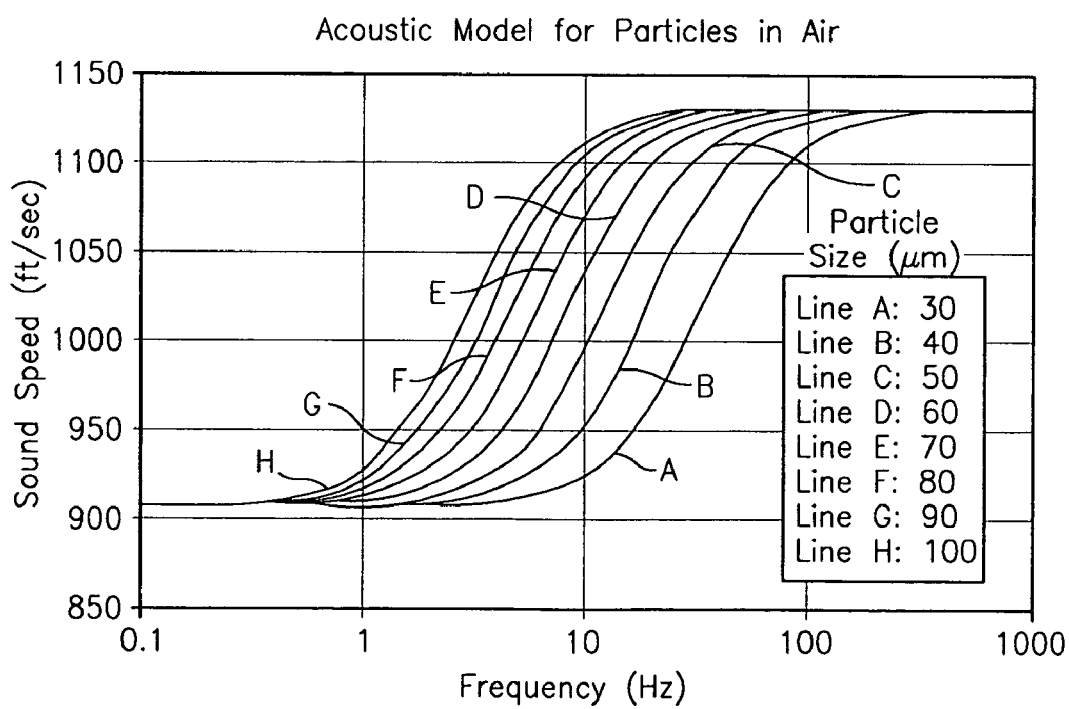
FIG. 15 is a plot of sound speed as a function of frequency for air/particle mixtures with varying particle size where the air-to-particle mass ratio is fixed in accordance with the present invention.

Two parameters of particular interest in steam processes and air-conveyed particles processes are particle size and air-to-fuel mass ratio or steam quality. To this end, it is of interest to examine the dispersive characteristics of the mixture as a function of these two variables. FIG. 14 and FIG. 15 show the dispersive behavior in relations to the speed of sound for coal/air mixtures with parameters typical of those used in pulverized coal deliver systems.

In particular FIG. 14 shows the predicted behavior for nominally 50 µm size coal in air for a range of air-to-fuel ratios. As shown, the effect of air-to-fuel ratio is well defined in the low frequency limit. However, the effect of the air-to-fuel ratio becomes indistinguishable at higher frequencies, approaching the sound speed of the pure air at high frequencies (above ~100 Hz).

Similarly, FIG. 9 shows the predicted behavior for a coal/air mixture with an air-to-fuel ratio of 1.8 with varying particle size. This figure illustrates that particle size has no influence on either the low frequency limit (quasi-steady) sound speed, or on the high frequency limit of the sound speed. However, particle size does have a pronounced effect in the transition region.

FIG. 14 and FIG. 15 illustrate an important aspect of the present invention: namely, that the dispersive properties of dilute mixtures of particles suspended in a continuous liquid can be broadly classified into three frequency regimes: low frequency range, high frequency range and a transitional frequency range. Although the effect of particle size and air-to-fuel ratio are inter-related, the predominant effect of air-to-fuel ratio is to determine the low frequency limit of the sound speed to be measured and the predominate effect of particle size is to determine the frequency range of the transitional regions. As particle size increases, the frequency at which the dispersive properties appear decreases. For typical pulverized coal applications, this transitional region begins at fairly low frequencies, ~2 Hz for 50 µm size particles.

Given the difficulties measuring sufficiently low frequencies to apply the quasi-steady model and recognizing that the high frequency sound speed contains no direct information on either particle size or air-to-fuel ratio, it becomes apparent that the dispersive characteristics of the coal/air mixture should be utilized to determine particle size and air-to-fuel ratio based on speed of sound measurements.

Some or all of the functions within the flow logic 36 may be implemented in software (using a microprocessor or computer) and/or firmware, or may be implemented using analog and/or digital hardware, having sufficient memory, interfaces, and capacity to perform the functions described herein.

While FIG. 8 and FIG. 11 depict two different embodiments of the flow logic 36 to measure various parameters of the flow process, the present invention contemplates that the functions of these two embodiments may be performed by a single flow logic 36.

It should be understood that any of the features, characteristics, alternatives or modifications described regarding a particular embodiment herein may also be applied, used, or incorporated with any other embodiment described herein.

It is to be understood that the above-described arrangements are only illustrative of the application of the principles of the present invention. Numerous other modifications and alternative arrangements may be devised by those skilled in the art without departing from the spirit and scope of the present invention, and the appended claims are intended to cover such modifications and arrangements.

What is claimed is:

1. A system for operating a flow process, wherein a device disposed in the flow process causes unsteady pressures to be generated in a fluid flowing in a pipe in the flow process, the system comprising:

a meter for measuring at least one parameter of the fluid in the flow process, the meter including a spatial array of at least two strain sensors disposed at different axial locations along a section of the pipe where the unsteady pressures are present in the fluid, each of the at least two strain sensors providing a pressure signal indicative of pressure within the pipe at a corresponding axial location; and a signal processor configured to output a flow signal and a diagnostic signal in response to the pressure signals, the flow signal indicating the at least one parameter of the fluid and the diagnostic signal indicating a diagnostic condition of the device.

2. The system of claim 1, further comprising:

selection logic responsive to the diagnostic signal and the flow signal, the selection logic provides a monitor output signal indicative of at least one of the flow signal and the diagnostic signal.

3. The system of claim 1, wherein the parameter of the fluid includes at least one of:

speed of sound in the fluid, gas volume fraction of the fluid, volumetric flow rate, size of particles suspended in the fluid, mass flow rate of the fluid, enthalpy of the fluid, and velocity of the fluid.

4. The system of claim 3, wherein the parameter of the fluid is the gas phase fraction of the fluid, and the fluid is one of a liquid having entrained gas, a mixture having entrained gas, and a slurry having entrained gas.

5. The system of claim 4, wherein the signal processor includes flow logic configured to:
  determine a slope of an acoustic ridge in a k-ω plane to determine the speed of sound propagating through the fluid; and
  determine the gas phase fraction of the flow in response to the measured speed of sound.

6. The system of claim 5, wherein the flow logic is further is configured to:
  determine a velocity of the fluid in response to the pressure signals;
  determine the volumetric flow rate through the pipe using a cross-sectional area of the pipe and the velocity of the fluid, and
  correct the volumetric flow rate of the fluid using the gas phase fraction of the fluid.

7. The system of claim 1 wherein the device in the flow process is acoustically coupled to the pipe at least at the location of the spatial array.

8. The system of claim 1 wherein the at least two strain sensors are selected from a group consisting of: piezoelectric, piezoresistive, strain gauge, PVDF, optical sensors, ported ac pressure sensors, accelerometers, velocity, pressure, and displacement sensors.

9. The system of claim 1, wherein the at least two strain sensors are wrapped around at least a portion of the pipe and do not contact the fluid.

10. A system for operating a flow process, wherein a device causes unsteady pressures to be generated in a fluid flowing in a pipe in the flow process, the system comprising:
  a meter for measuring at least one parameter of the fluid in the flow process, the meter including a spatial array of at least two strain sensors disposed at different axial locations along a section of the pipe where the unsteady pressures are present in the fluid each of the at least two strain sensors providing a pressure signal indicative of pressure within the pipe at a corresponding axial location; and
  a signal processor configured to output a flow signal and a diagnostic signal in response to the pressure signals, the flow signal indicating the at least one parameter of the fluid and the diagnostic signal indicating a diagnostic condition of the device;
  wherein the signal processor is operable to compare an input evaluation signal based on the pressure signals against a diagnostic evaluation criteria to determine the diagnostic condition of the device.

11. The system of claim 10, wherein the diagnostic evaluation criteria is based on a signature in at least one of the frequency domain, time domain, spatial domain, wave-number, and k-ω domain.

12. A method of operating a flow process, wherein a device disposed within the flow process causes unsteady pressures to be generated in a fluid flowing in a pipe in the flow process, the method comprising:
  receiving pressure signals from a meter including a spatial array of at least two strain sensors disposed at different axial locations along a section of the pipe where the unsteady pressures are present in the fluid, each of the at least two strain sensors providing a pressure signal indicative of pressure within the pipe at a corresponding axial location; and
  providing a diagnostic signal and a flow signal in response to the pressure signals, the diagnostic signal indicating a diagnostic condition of the device, and the flow signal being indicative of a parameter of a fluid flowing within the flow process.

13. The method of claim 12, wherein the parameter of the fluid includes at least one of: speed of sound in the fluid, gas volume fraction of the fluid, volumetric flow rate, size of particles suspended in the fluid, mass flow rate of the fluid, enthalpy of the fluid, and velocity of the fluid.

14. The method of claim 13, wherein the parameter of the fluid is the gas phase fraction of the fluid, and the fluid is one of a liquid having entrained gas, a mixture having entrained gas, and a slurry having entrained gas.

15. The method of claim 14, wherein processing the pressure signals to provide the parameter of the fluid includes:
  determining a slope of an acoustic ridge in a k-ω plane to determine the speed of sound propagating through the fluid; and
  determining the gas phase fraction of the flow in response to the measured speed of sound.

16. The method of claim 15, wherein processing the pressure signals to provide the parameter of a fluid further includes:
  determining a velocity of the fluid in response to the pressure signals;
  determining the volumetric flow rate of the pipe using a cross-sectional area of the pipe and the velocity of the fluid, and
  correcting the volumetric flow rate of the fluid using the gas volume fraction of the fluid.

17. The method of claim 12 wherein the device is acoustically coupled to the pipe at least at the location of the spatial array.

18. The method of claim 12 wherein the at least two strain sensors are selected from a group consisting of: piezoelectric, piezoresistive, strain gauge, PVDF, optical sensors, ported ac pressure sensors, accelerometers, velocity, pressure, and displacement sensors.

19. The method of claim 12, wherein the at least two strain sensors are wrapped around at least a portion of the pipe and do not contact fluid within the flow process.

20. A method of operating a flow process, wherein a device disposed within the flow process causes unsteady pressures to be generated in a fluid flowing in a pipe in the flow process, the method comprising:
  receiving pressure signals from a meter including a spatial array of at least two strain sensors disposed at different axial locations along a section of the pipe where the unsteady pressures are present in the fluid, each of the at least two strain sensors providing a pressure signal indicative of pressure within the pipe at a corresponding axial location; and
  providing a diagnostic signal and a flow signal in response to the pressure signals, the diagnostic signal indicating a diagnostic condition of the device, and the flow signal being indicative of a parameter of a fluid flowing within the flow process;
  wherein providing the diagnostic condition further includes comparing an input evaluation signal based on the pressure signals against a diagnostic evaluation criteria to determine the diagnostic condition of the device.

21. The method of claim 20, wherein the evaluation criteria is based on a signature in at least one of the frequency domain, time domain, spatial domain, wave-number, and k-ω domain.

22. A diagnostic monitoring system for monitoring the health of a device that is acoustically coupled to a pipe, wherein the device causes unsteady pressures to be generated in a fluid flowing in the pipe; the system comprising:
  at least one sensor disposed to measure pressures within the pipe along a section of the pipe where the unsteady pressures caused by the device are present in the fluid, the at least one sensor providing a sensor output signal; and diagnostic processing logic, responsive to said sensor output signal, which provides a diagnostic condition indicative of the health of the device, wherein said diagnostic processing logic comprises logic which compares an input evaluation signal based on said sensor output signal against a diagnostic evaluation criteria to determine the health of the device.

23. The system of claim 22 wherein said evaluation criteria is based on a signature in at least one of the frequency domain, time domain, spatial domain, wave-number, and k-$\omega$ domain.

24. A diagnostic monitoring system for monitoring the health of a device that is acoustically coupled to a pipe, wherein the device causes unsteady pressures to be generated in a fluid flowing in the pipe; the system comprising:

at least one sensor disposed to measure pressures within the pipe along a section of the pipe where the unsteady pressures caused by the device are present in the fluid, the at least one sensor providing a sensor output signal; and diagnostic processing logic, responsive to said sensor output signal, which provides a diagnostic condition indicative of the health of the device.

25. The system of claim 24 wherein said device is acoustically coupled to the pipe at least at the location of said at least one sensor.

26. The system of claim 24 wherein said at least one sensor comprises an axial array of at least two sensors.

27. The system of claim 24 wherein said at least one sensor is selected from a group consisting of: piezoelectric, piezoresistive, strain gauge, PVDF, optical sensors, ported ac pressure sensors, accelerometers, velocity, pressure, and displacement sensors.

28. The system of claim 24 wherein the device includes at least one of motors, fans, pumps, generators, engines, gears, belts, drives, pulleys, hangers, clamps, actuators, valves, heat exchangers, and meters.

29. A method of monitoring the health of a device that is acoustically coupled to a pipe, wherein the device causes unsteady pressures to be generated in a fluid flowing in the pipe, the method comprising:

disposing at least one sensor to measure pressures within the pipe along a section of the pipe where the unsteady pressures are present in the fluid, the at least one sensor providing a sensor output signal;

providing a diagnostic condition indicative of the health of the device in response to said sensor output signal.

30. The method of claim 29 wherein said device is acoustically coupled to the pipe at least at the location of said at least one sensor.

31. The method of claim 29 wherein said at least one sensor comprises an axial array of at least two sensors.

32. The method of claim 29 wherein said at least one sensor is selected from a group consisting of: piezoelectric, piezoresistive, strain gauge, PVDF, optical sensors, ported ac pressure sensors, accelerometers, velocity, pressure, and displacement sensors.

33. The method of claim 29 wherein the device includes at least one of motors, fans, pumps, generators, engines, gears, belts, drives, pulleys, hangers, clamps, actuators, valves, heat exchangers, and meters.

34. A method of monitoring the health of a device that is acoustically coupled to a pipe, wherein the device causes unsteady pressures to be generated in a fluid flowing in the pipe, the method comprising:

disposing at least one sensor to measure pressures within the pipe along a section of the pipe where the unsteady pressures are present in the fluid the at least one sensor providing a sensor output signal;

providing a diagnostic condition indicative of the health of the device in response to said sensor output signal; and comparing an input evaluation signal based on said sensor output signal against a diagnostic evaluation criteria to determine the health of the device.

35. The method of claim 34 wherein said diagnostic evaluation criteria is based on a signature in at least one of the frequency domain, time domain, spatial domain, wave-number, and k-$\omega$ domain.

* * * * *